(12) United States Patent
Shirakabe et al.

(10) Patent No.: US 7,415,275 B2
(45) Date of Patent: Aug. 19, 2008

(54) FREQUENCY SELECTION APPARATUS, A MOBILE COMMUNICATIONS SYSTEM, AND A MULTI-BAND FREQUENCY RESOURCE MANAGEMENT METHOD

(75) Inventors: Masashige Shirakabe, Yokohama (JP); Satoru Fukumoto, Yokosuka (JP); Hitoshi Yoshino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 347 days.

(21) Appl. No.: 11/138,301

(22) Filed: May 27, 2005

(65) Prior Publication Data

US 2005/0271009 A1 Dec. 8, 2005

(30) Foreign Application Priority Data

May 28, 2004 (JP) ............................. 2004-160142

(51) Int. Cl.
*H04Q 7/20* (2006.01)
(52) U.S. Cl. ................................. 455/435.2; 455/180.1
(58) Field of Classification Search ................. 370/329, 370/331, 335, 342; 455/450, 451, 452, 453, 455/180.1, 435.2, 63.1–63.3
See application file for complete search history.

(56) References Cited

U.S. PATENT DOCUMENTS

| | | | | |
|---|---|---|---|---|
| 5,737,705 A | * | 4/1998 | Ruppel et al. | ............ 455/452.2 |
| 5,898,928 A | * | 4/1999 | Karlsson et al. | ............ 455/450 |
| 6,282,184 B1 | * | 8/2001 | Lehman et al. | ............ 370/342 |
| 6,985,737 B2 | | 1/2006 | Yamaguchi et al. | |
| 2006/0285523 A1 | * | 12/2006 | Ishii et al. | ................... 370/335 |

FOREIGN PATENT DOCUMENTS

CN 1402569 A 3/2003

OTHER PUBLICATIONS

Roland Heickero, et al., "Ericsson seamless network", Ericsson Review, No. 2, 2002, pp. 76-83.
"1.5GHz/800MHz dual band system", New Technology Report, NTT DoCoMo Technical Journal, vol. 10, No. 1, Apr. 2003, pp. 6-14 (with partial English translation).
Gertie Alsenmyr, et al., "Handover between WCDMA and GSM", Ericsson Review, No. 1, 2003, pp. 6-11.
Antii Tolli, et al., "Adaptive Load Balancing Between Multiple Cell Layers", IEEE, 2002, 5 pages.
Takashi Shono, et al., "Proposal for System Diversity on Software Defined Radio", IEICE Trans. Fundamentals, vol. E84-A, No. 9, Sep. 2001, pp. 2346-2358.

* cited by examiner

*Primary Examiner*—William Trost
*Assistant Examiner*—James D Ewart
(74) *Attorney, Agent, or Firm*—Oblon, Spivak, McClelland, Maier & Neustadt, P.C.

(57) ABSTRACT

A frequency selection apparatus, a mobile communications system, and a multi-band resource management method are disclosed. The frequency selection apparatus includes
    an acquisition unit configured to collect environmental information about a mobile station for each frequency band according to system frequency bands that a mobile station can use, and
    a frequency selection unit configured to determine the frequency band to be used and the system to be connected to, based on the environmental information and information provided by the mobile station.

9 Claims, 33 Drawing Sheets

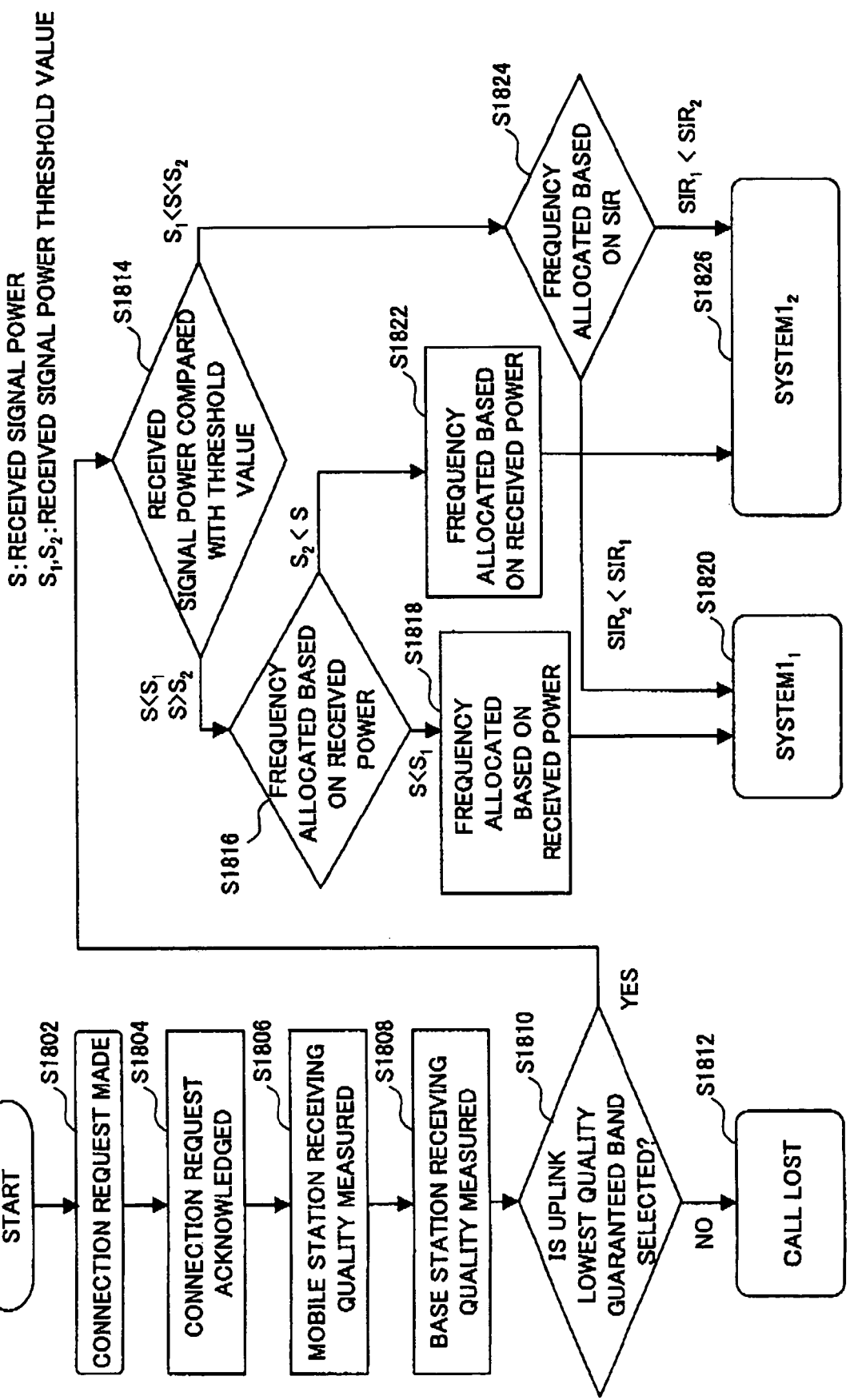

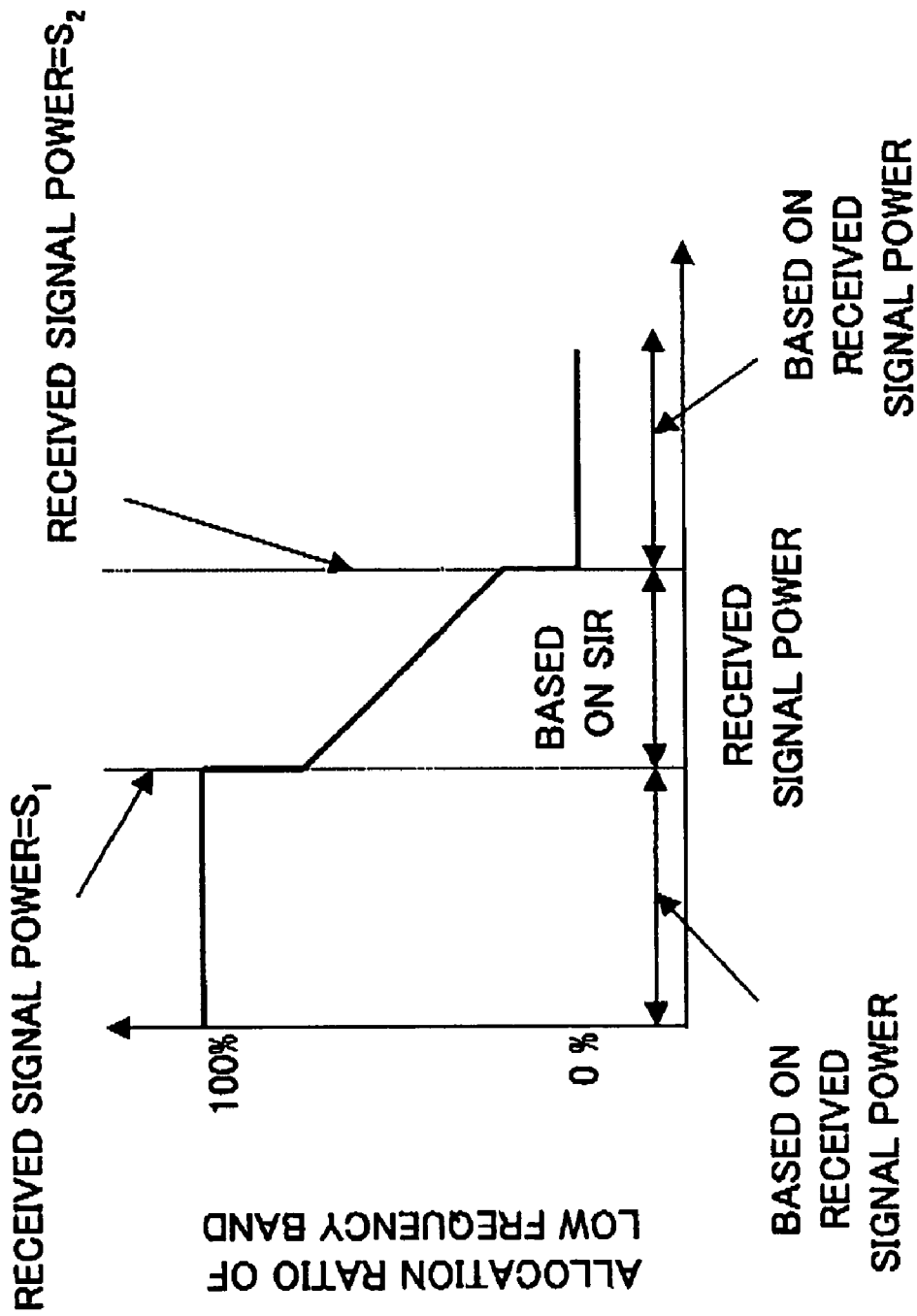

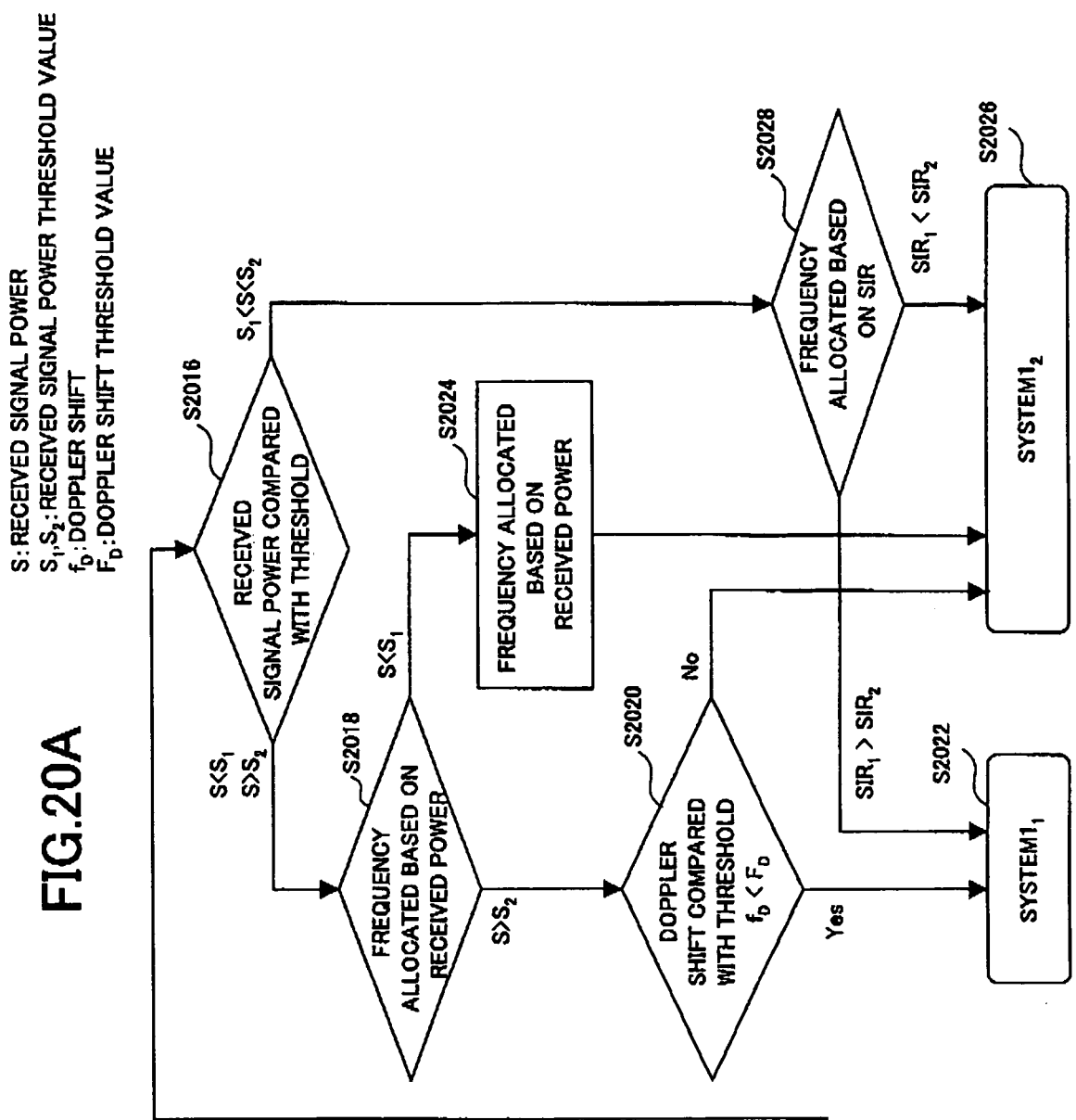
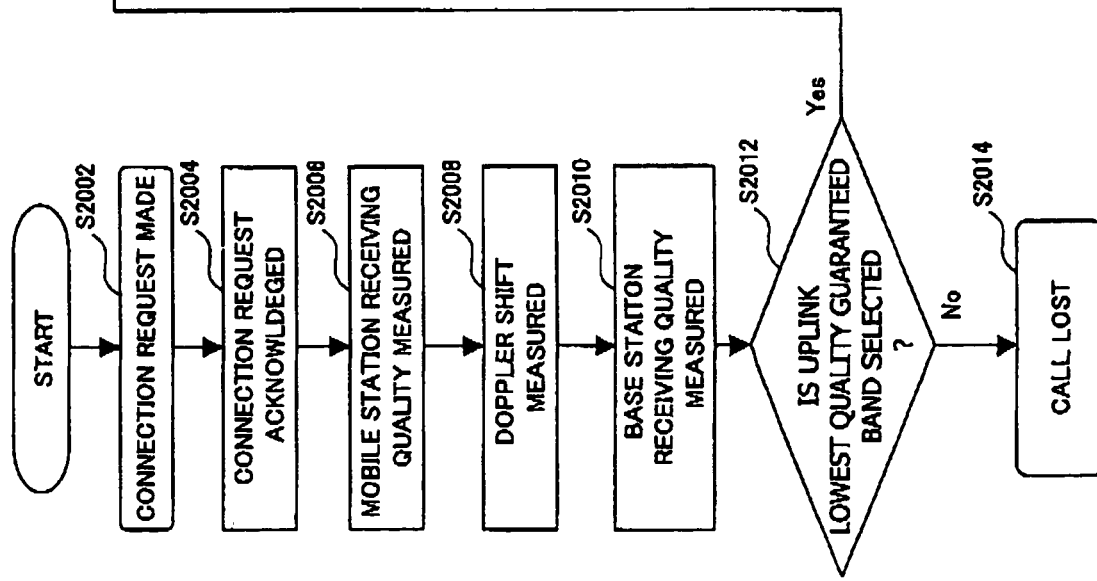
FIG.20A

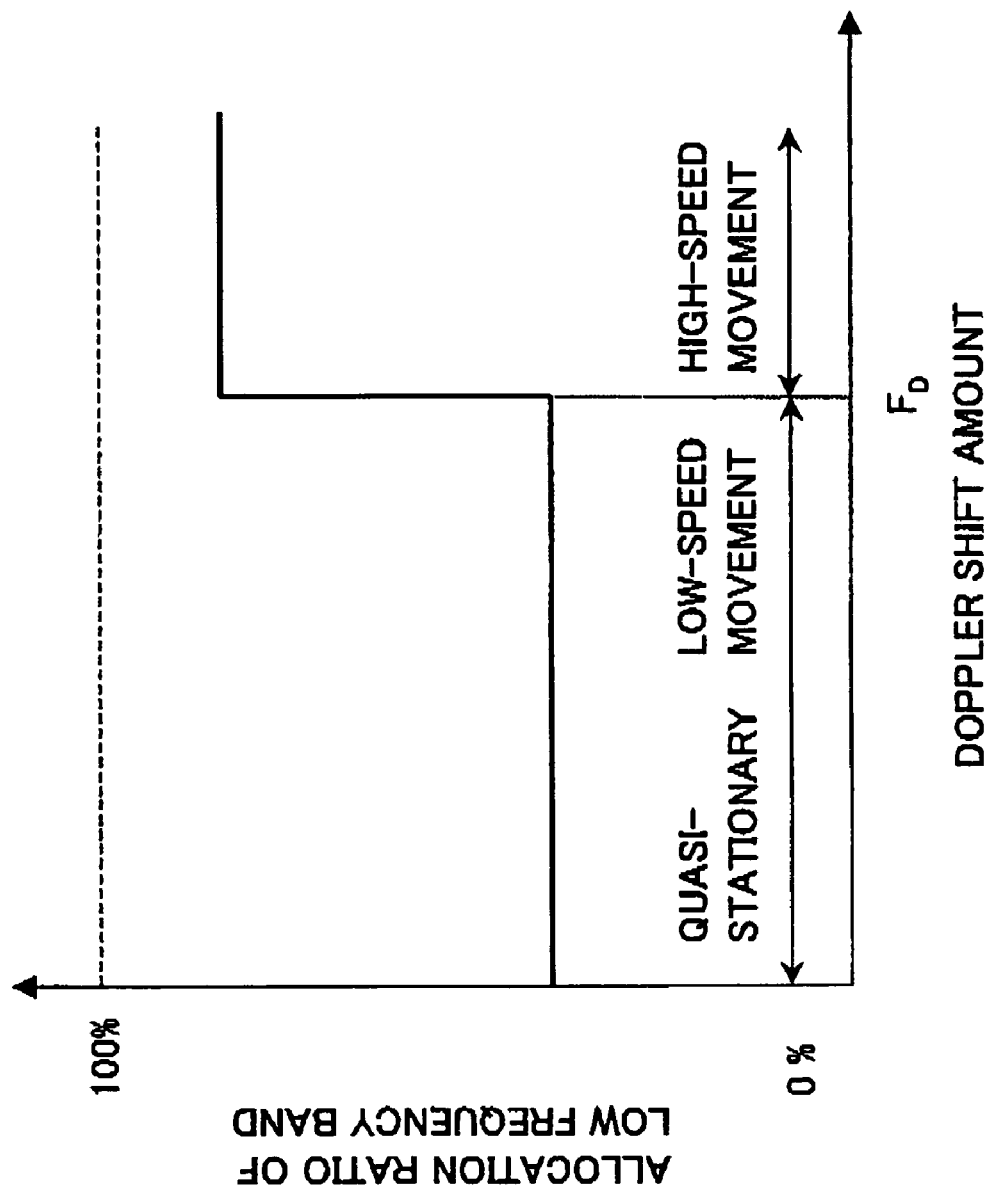

FREQUENCY SELECTION APPARATUS, A MOBILE COMMUNICATIONS SYSTEM, AND A MULTI-BAND FREQUENCY RESOURCE MANAGEMENT METHOD

BACKGROUND OF THE INVENTION

1. Field of the Invention

The present invention generally relates to a frequency selection apparatus, a mobile communications system, and a multi-band frequency resource management method for realizing effective use of frequency resources, maintaining a service area, and improving throughput under an environment where two or more cellular systems using the same communication system in two or more frequency bands are in service.

2. Description of the Related Art

In recent years and continuing, demands for mobile communication services are rapidly increasing, and realization of high speed and large capacity communication services are called for, such as not only conventional voice and low speed data communications, but also moving picture and high-speed data transmissions. In order to meet these demands, it is necessary to use wide frequency band in mobile communications services that are capable of providing both high-speed (large capacity) and low-speed data communications.

However, radio frequency is a limited resource, and since it is difficult to obtain a wide band, communication systems that effectively use frequency are called for. Although radio communication systems have been advanced, are being diversified, and are offering various services, there are cases where a sufficient service area cannot be offered by a new system to be introduced.

Further, a radio communication system that uses two or more different frequency bands has been proposed, and put in practical use (for example, Non-Patent Reference 1), the radio communication system providing a wide service area and effective use of frequency.

Further, in PDC (Personal Digital Cellular), a system that is compatible with an 800 MHz and a 1.5 GHz band is available (for example, Non-Patent Reference 2). A base station and a mobile station according to this method are capable of standing-by, and communicating in the 800 MHz band and the 1.5 GHz band, wherein a frequency channel from one of the 800 MHz band and 1.5 GHz band is assigned. In this way, congested traffic of the 800 MHz band is distributed to the 1.5 GHz band.

Further, the frequency band at which the mobile station stands by is assigned based on information about a "band shift probability", the information being provided by the network. A frequency channel that is available to the mobile station is obtained by the mobile station measuring the received signal strength of both frequency bands when a voice communication is to be carried out such that a suitable frequency band that can satisfy a desired quality is selected, and the communication is carried out.

Further, in Europe, in an attempt to smoothly introduce a W-CDMA (Wideband Code Division Multiple Access) system, a mobile station compatible to both W-CDMA and GSM (Global System for Mobile Communications) is being studied, and an experimental verification of connecting the compatible mobile station to a GSM and a W-CDMA network is also being carried out (for example, Non-Patent Reference 3).

A handover process from W-CDMA to GSM is as follows. In the case that a mobile station is communicating by using a switched line of a W-CDMA system, when received signal strength becomes less than a threshold, the network of W-CDMA directs the mobile station to measure a GSM signal. If the mobile station finds a GSM base station, a signal of which is greater than the threshold of received signal strength, the handover from W-CDMA to GSM is started.

Then, a RAN (Radio Access Network) Controller determines whether a resource is available at the GSM base station. If the determination is affirmative, i.e., if there is a resource that can be assigned, the GSM base station transmits a handover command.

When the mobile station receives the handover command, connection to the GSM base station is carried out. As a result, a radio connection in agreement with the command is established. Then, the mobile station transmits a handover completion message to the GSM base station, connection with a GSM network is started, and the connection with the W-CDMA network is released.

A study is also being made about controlling two or more communication systems. There, a mobile station is controlled so that it is connected to one of the communication systems. In this way, system throughput is raised compared with the case where the mobile station is capable of communicating in only one communication system (for example, Non-Patent Reference 4 reference).

Further, studies are being made about methods to improve the throughput (for example, Non-Patent Reference 5). An example is a method wherein resources of two or more systems using the same communication parameter are independently controlled such that loads are properly distributed between the systems. Another example is a method wherein each mobile station corresponding to each system selects a system that provides the greatest throughput where two or more systems each having different transmission speed, number of channels, area composition, and propagation property are available.

By controlling two or more radio systems as described above, effective use of frequency resources, obtaining a service area, and improvement in the throughput are attained.

[Non-Patent Reference 1] R. Heichkero, et al., "Ericsson Seamless Network", Ericsson Review, No. 2, pp. 76-83, 2002

[Non-Patent Reference 2] Yeshiva, Fukazawa, and Masuda, "Special Issue: 1.5 GHz band common method, System Outline", NTT DoCoMo Technical Journal, Vol. 10, No. 1, pp. 6-14, April 2003

[Non-Patent Reference 3] G. Alsenmyr, et al., "Handover Between WCDMA and GSM", Ericsson Review, No. 1, pp. 6-11, 2003

[Non-Patent Reference 4] A. Tolli and P. Hakalin, "Adaptive Load Balancing between Multiple Cell Layers", proceedings of VTC Fall 2002, Vol. 3, pp. 1691-1695, September 2002

[Non-Patent Reference 5] T. Shono, K. Uehara, and S. Kubota, "Proposal for System Diversity on Software Defined Radio", IEICE Trans. on Fund., Vol. E84-A, No. 9, pp. 2346-2358, September 2002

[Description of the Invention]

[Problem(s) to be Solved by the Invention]

However, there are the following problems in the conventional technologies described above.

In the control system described above, control is performed based on measurement of a received signal, wherein difference in the frequency characteristic of the signal is not taken into consideration.

When selecting a system out of systems that use different frequency bands, and switching is to be carried out in an actual system, it is necessary to consider differences in propagation properties, fading influences, and the frequency bandwidth that can be obtained in real environments.

SUMMARY OF THE INVENTION

Accordingly, it is a general object of the present invention to provide a frequency selection apparatus, a mobile communications system, and a multi-band control method that realize effective use of frequency resources, substantially obviating one or more of the problems caused by the limitations and disadvantages of the related art.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by a frequency selection apparatus, a mobile communications system, and a multi-band resource management method particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides as follows.

[Means for Solving the Problem]

In order to solve the problems, the radio frequency selection apparatus of the present invention for two or more cellular systems using two or more frequency bands includes an information acquisition unit for acquiring environmental information about a mobile station corresponding to each of frequency bands that are available to the mobile station, and a determination unit for determining a frequency band to be used, and a system to be connected based on the environmental information and information provided by the mobile station.

In this way, the system selection can be carried out considering a difference in the propagation property due to frequency bands.

Furthermore, the radio frequency selection apparatus may include a system selection unit for selecting a system that satisfies the required quality at the mobile station based on the received signal of an uplink, and a frequency band allocation unit for assigning a frequency band based on the selection result and information provided by the mobile station.

Furthermore, the radio frequency selection apparatus may include a threshold determination unit for comparing a certain value contained in the environmental information with a corresponding threshold value, wherein the frequency band allocation means assigns a frequency band based on the determination of the threshold determination means.

Furthermore, the radio frequency selection apparatus may include an allocation ratio setting unit for setting up a ratio of traffic amounts to be assigned to the frequency bands based on the environmental information.

Furthermore, the frequency band allocation means may be configured to assign a frequency band based on at least one of SIR criteria, received power criteria, and Doppler shift criteria according to the determination of the threshold determination means.

Furthermore, the frequency band allocation means may be configured to assign a frequency band based on received power and traffic information.

Furthermore, the acquisition means may be configured to include at least one of the information of received signal acquisition means, received signal measurement means, and traffic measurement means.

Furthermore, the radio frequency selection apparatus may include a threshold setting unit for setting up a threshold based on the traffic information and the information provided by the mobile station.

Further, the multi-band resource management method in for two or more cellular systems using two or more frequency bands according to the present invention includes a step of acquiring environmental information about a mobile station corresponding to each frequency band according to the system frequency band available to the mobile station, and a step of determining a frequency band to be used and a system to be connected to based on the environmental information and the information provided by the mobile station. In this way, system selection is carried out taking a difference in the propagation property due to frequency bands into consideration.

[Effect of the Invention]

According to embodiments of the present invention, the frequency selection apparatus, the mobile communications system, and the multi-band resource management method that realize effective use of frequency resources are offered.

BRIEF DESCRIPTION OF THE DRAWINGS

FIG. 18A is a flowchart showing the system selection flow according to the embodiment of the present invention;

FIG. 18B is a graph showing the allocation ratio to the low frequency band system;

FIG. 20A is a flowchart showing the system selection flow according to the embodiment of the present invention;

FIG. 20B is a graph showing the allocation ratio to the low frequency band system;

DESCRIPTION OF THE PREFERRED EMBODIMENTS

Figure 1:
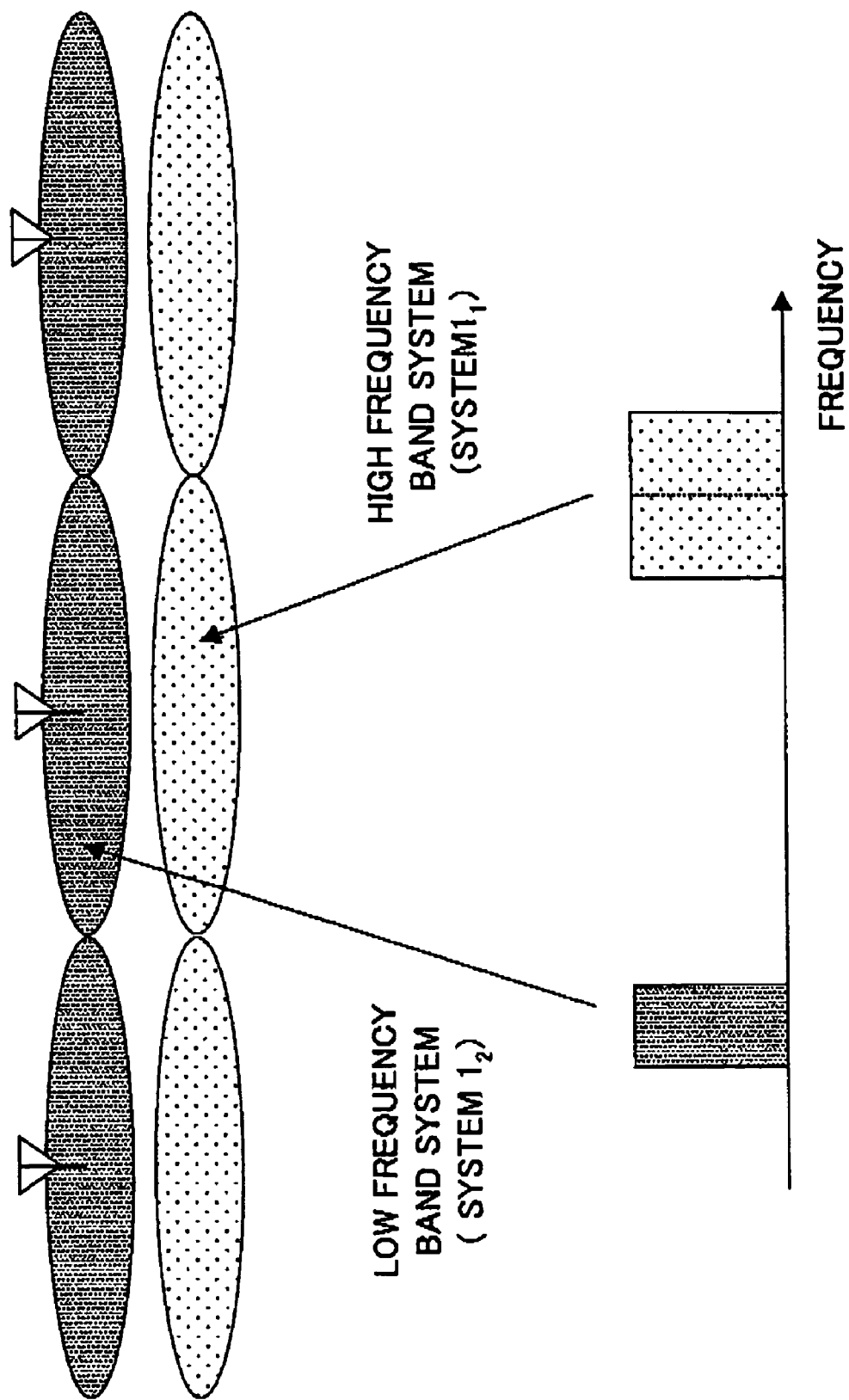
FIG. 1 shows the concept of an example of a different frequency coexistence system.

In the following, Embodiments of the present invention are described with reference to the accompanying drawings.

In the drawings, an item that has the same function shall bear the same reference number, and the description thereof may not be repeated.

First, Embodiment 1 is discussed wherein two or more cellular systems using different frequency bands are described with reference to FIG. 1. Here, the present Embodiment includes two cellular systems using the same communication system such as GSM.

According to Embodiment 1, the frequency bands of the two cellular systems are not overlapped, i.e., a system $1_1$ uses a high frequency band, and a system $1_2$ uses a low frequency band. The radio-wave-propagation property between a mobile station and a base station of one of the cellular systems is different from the other, due to difference in the frequency bands.

Generally, the higher frequency band a cellular system uses, the wider bandwidth the cellular system can offer. Accordingly, the system $1_1$ provides a wider bandwidth than the system $1_2$. Further, each of the cellular systems has the same service area. That is, one base station can transmit the signals of the two systems.

Figure 2:
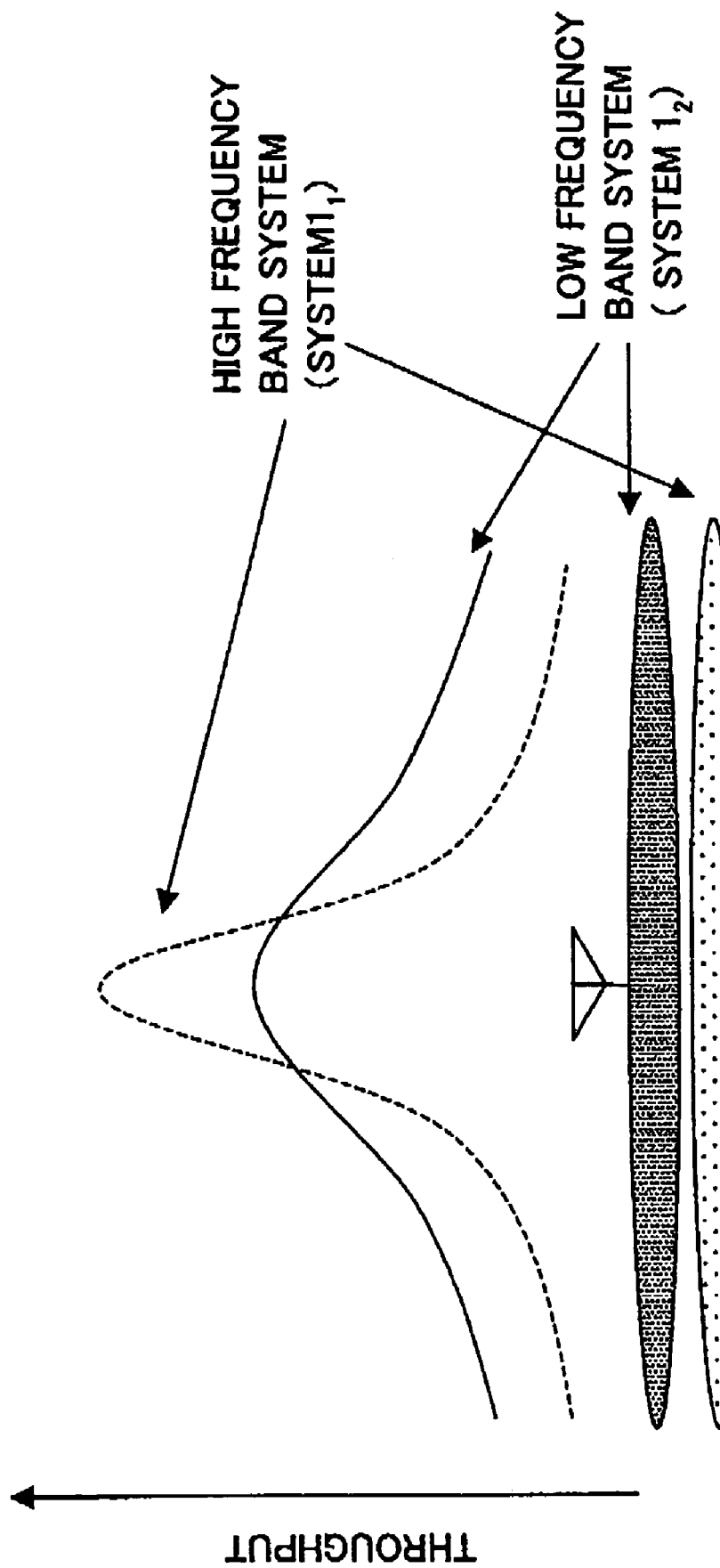
FIG. 2 gives graphs showing an example of throughput properties of the different frequency coexistence system.

Next, relations between the distance from the base station and a throughput is described with reference to FIG. 2 concerning the two cellular systems each using frequencies different from the other. When the two cellular systems transmit at the same transmission power level using the same communication system, and the same base station arrangement, the total throughput realizable in each system is dependent on the system frequency bandwidth that the system can use.

The throughput realizable in each communication transmission is dependent on the radio-wave-propagation property according to the distance and frequency between a mobile station and the base station. Therefore, since the magnitude of propagation attenuation is small near the base station, the received signal strength at the mobile station is great enough, and the system $1_1$, providing a wider band and a greater system capacity, provides a higher throughput than the system $1_2$. On the other hand, if the mobile station is located far from the base station, the magnitude of propagation attenuation is great, and the received signal strength becomes small; then, the system $1_1$ using the higher frequency band has the greater magnitude of propagation attenuation than the system $1_2$, and the throughput of the system $1_1$ becomes less than the throughput of the system $1_2$.

Figure 3:
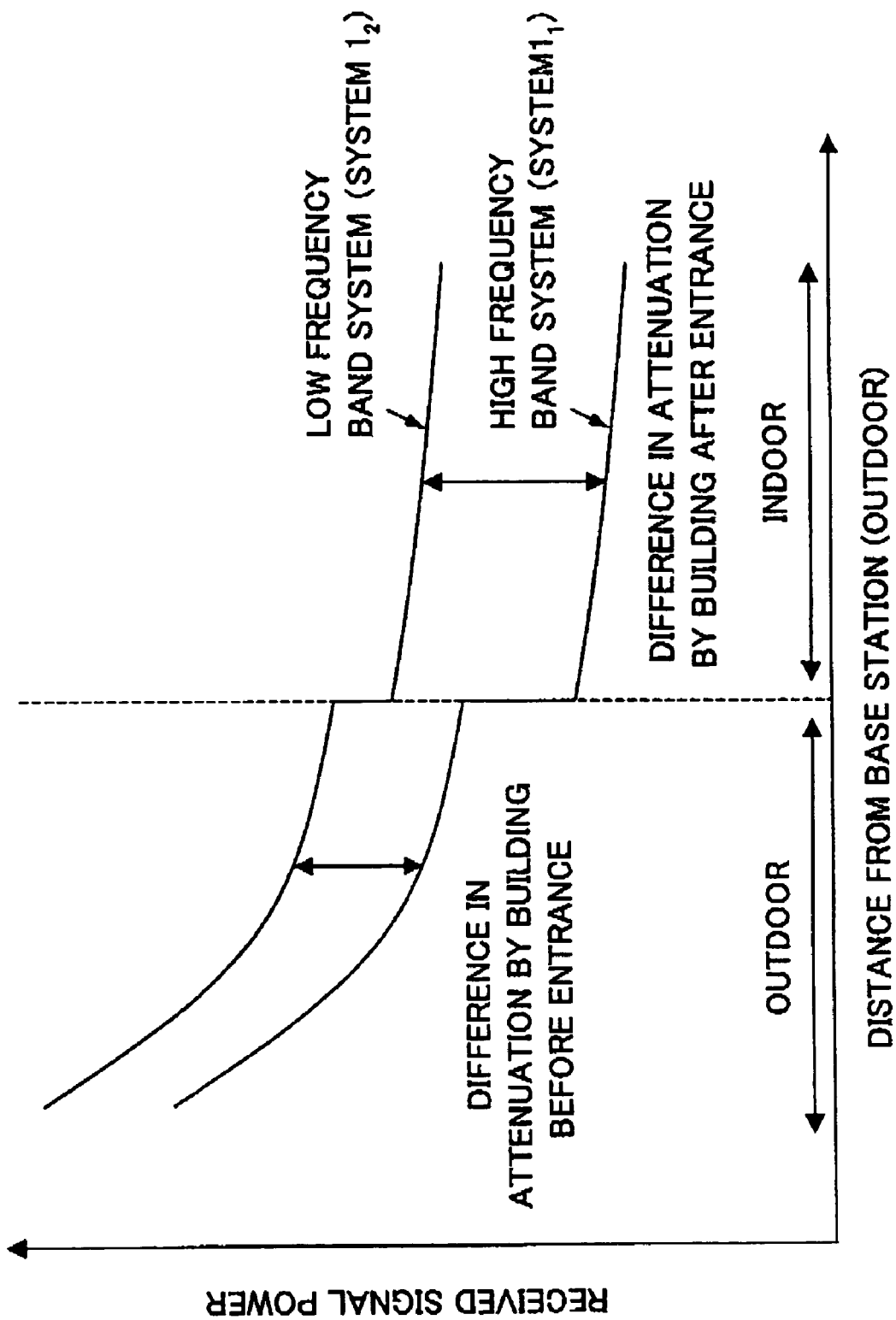
FIG. 3 gives graphs showing attenuation caused by a building for each of the different frequency bands.

Next, an example of attenuation due to a building, etc., is described with reference to FIG. 3, which applies to the case where the base station (outdoor) and a mobile station communicate while the mobile station enters the building, etc.

With either frequency, the received signal strength is decreased when the mobile station enters the building, and the like. However, the magnitude of attenuation is different from frequency to frequency, i.e., the received signal strength is different by frequencies. In other words, it is possible to estimate an environment (indoor, outdoor, etc.) where the mobile station is presently located based on the propagation losses corresponding to the respective frequency bands. Consequently, an allocation of an optimal frequency band resource and system selection can be carried out in consideration of the radio-wave-propagation properties (propagation attenuation, influence of fading, etc.) and service categories (QoS, etc.) according to the environment (indoor, outdoor, etc.) where the mobile station is present.

Figure 4:
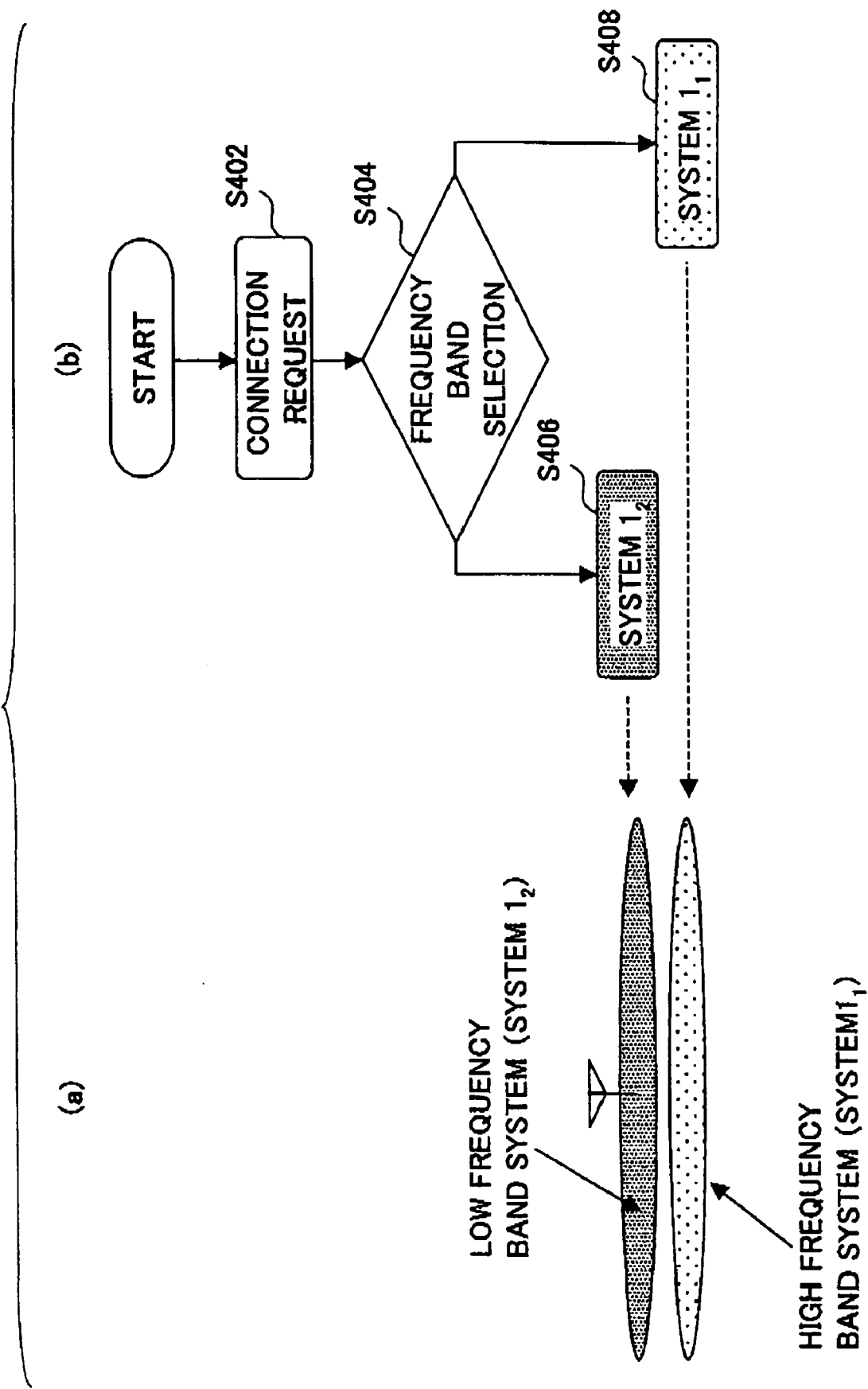
FIG. 4 is a flowchart showing the concept of system selection of the different frequency coexistence system.

Next, the system selection of the mobile communication system according to the embodiment of the present invention is described with reference to FIG. 4.

At Step S402, a request for connection between the base station and the mobile station is issued. Then, at Step S404, a frequency selection station determines a frequency band and a system to be used for the requested communication based on information provided by the base station and the mobile station.

The information includes the received signal strength at the mobile station and the base station, SIR (Signal to Interference power Ratio) at the mobile station, an amount of Doppler shift at the mobile station, and request from the mobile station such as data rate, QoS information that includes a required bit error rate, and the amount of traffic of each system. At least one of the information items as described above is used in determining the frequency band and the system to be used.

For example, if the information about the received signal strength, SIR, and the amount of Doppler shift is used, selection of the frequency band by multi-band resource management in consideration of the difference in the radio-wave-propagation property by the frequency band is possible. By controlling as described above, the frequency band is assigned to mobile stations and the system to be connected to is specified. Here, one of the system $1_1$ using the higher frequency and the system $1_2$ using the lower frequency is specified (Step S408 and Step S406, respectively).

Figure 5:
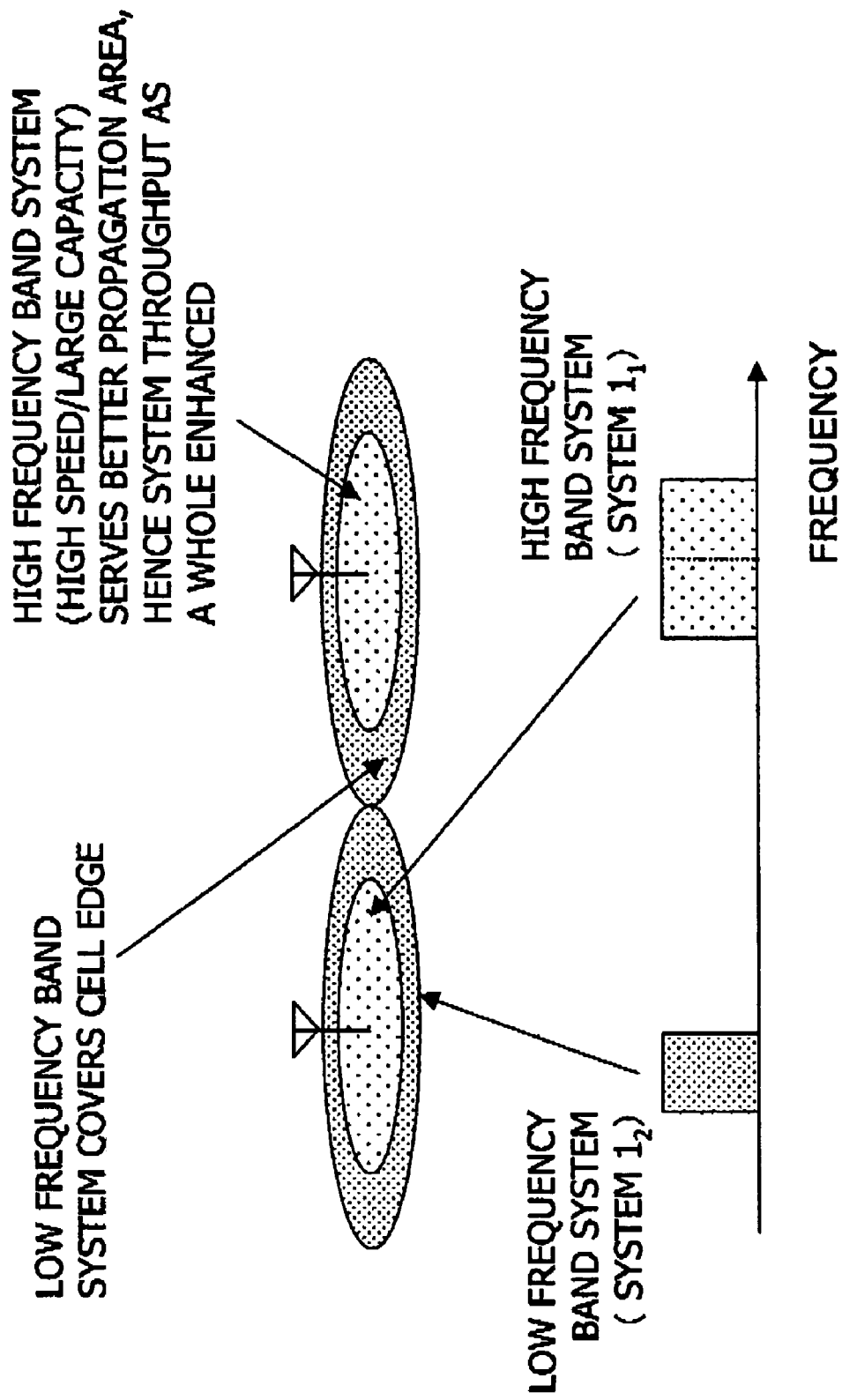
FIG. 5 shows the concept of band allocation of the different frequency coexistence system according to an embodiment of the present invention.

Further, the multi-band resource management can be carried out as shown in FIG. 5, wherein mobile stations near the base station are connected to the system $1_1$ using the higher frequency band, and the mobile stations near the cell edge are connected to the system $1_2$ using the lower frequency band. In this manner, the total throughput of all the systems can be raised.

According to the multi-band resource management, the frequency band is assigned based on the received signal strength at each mobile station by comparing the received signal strength with a threshold beforehand set up. The threshold is set up based on traffic distribution, QoS required by the mobile station, and the like.

Figure 6:
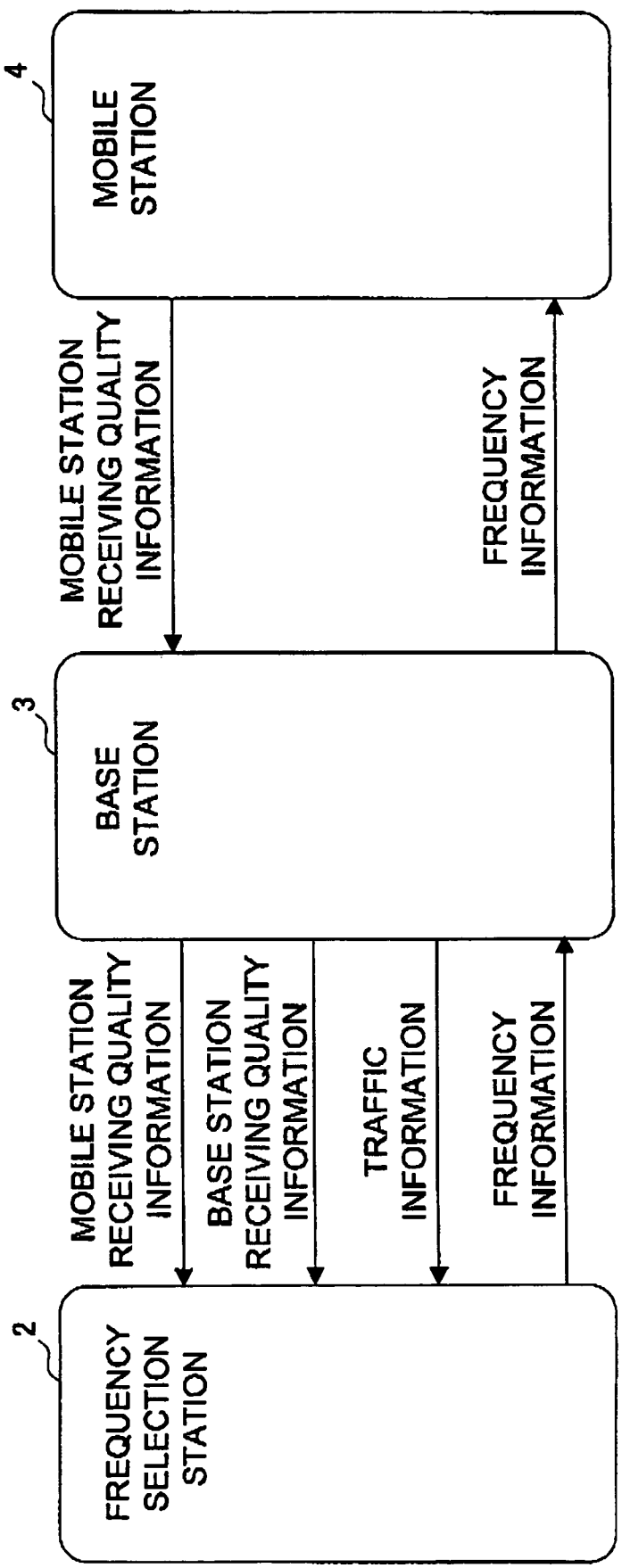
FIG. 6 is a block diagram showing the system configuration according to the embodiment of the present invention.

Next, a mobile communication system according to Embodiment 1 is described with reference to FIG. 6, which Embodiment includes a frequency selection station 2, a base station 3, and a mobile station 4.

The mobile station 4 transmits received signal information to the base station 3, then the base station 3 provides the received signal information provided by the mobile station 4, and received signal information and traffic information of the base station 3 to the frequency selection station 2.

The frequency selection station 2 specifies a frequency band to be used and a system to be linked to based on the received information. Information about the selected frequency band and the system is provided to the base station 3, and then to the mobile station 4 from the base station 3 such that a communication setup is performed based on the information about the selected frequency band and the system.

Figure 7:
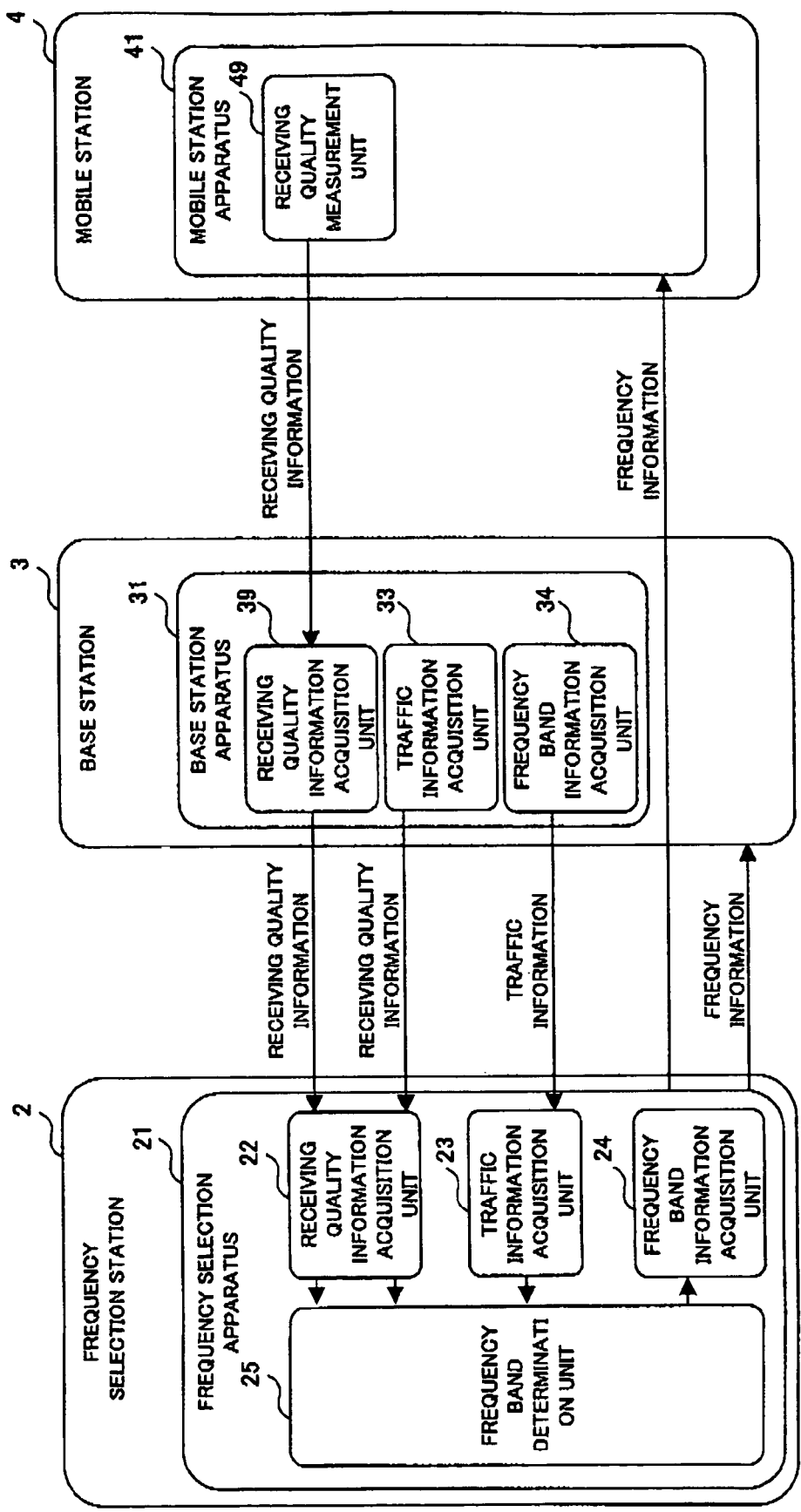
FIG. 7 is a block diagram showing the system configuration according to the embodiment of the present invention, and the relation to a control unit for explaining control thereof.

Details are described with reference to FIG. 7.

The mobile station 4 includes a mobile station apparatus 41 that further includes a received signal measurement unit 49. The received signal measurement unit 49 measures received signal, and transmits the measured received signal to a received signal information acquisition unit 39 of a base station apparatus 31 as mobile station information; details are described below.

The base station 3 includes the base station apparatus 31 that further includes the received signal information acquisition unit 39, a received signal measurement unit 33, and a traffic measurement unit 34. The received signal information acquisition unit 39 extracts the received signal information from the received mobile station information, and transmits the received signal information to a received signal information acquisition unit 22 of a frequency selection apparatus 21 of the frequency selection station 2. The received signal measurement unit 33 and the traffic measurement unit 34 measure the received signal at the base station 3 and the amount of traffic accommodated by the base station 3, respectively, and transmit the same to the received signal information acquisition unit 22 and the traffic information acquisition unit 23, respectively, of the frequency selection apparatus 21; details are described below.

The frequency selection station 2 includes the frequency selection apparatus 21 that further includes a frequency band determination unit 25 that is connected to the received signal information acquisition unit 22, the traffic information acquisition unit 23, and a frequency band information acquisition unit 24. The frequency band determination unit 25 determines a frequency band to be used based on the threshold that is beforehand set up based on the received signal information of the base station 3 and mobile station 4 that are provided by the received signal information acquisition unit 22, and the traffic information provided by the traffic information acquisition unit 23. Information about the determined frequency band is provided to the frequency band information acquisition unit 24 as frequency band information. The frequency band information acquisition unit 24 provides the frequency band information to the base station 3 and the mobile station 4. The base station 3 and the mobile station 4 perform a communication setup based on the frequency band information.

Figure 8:
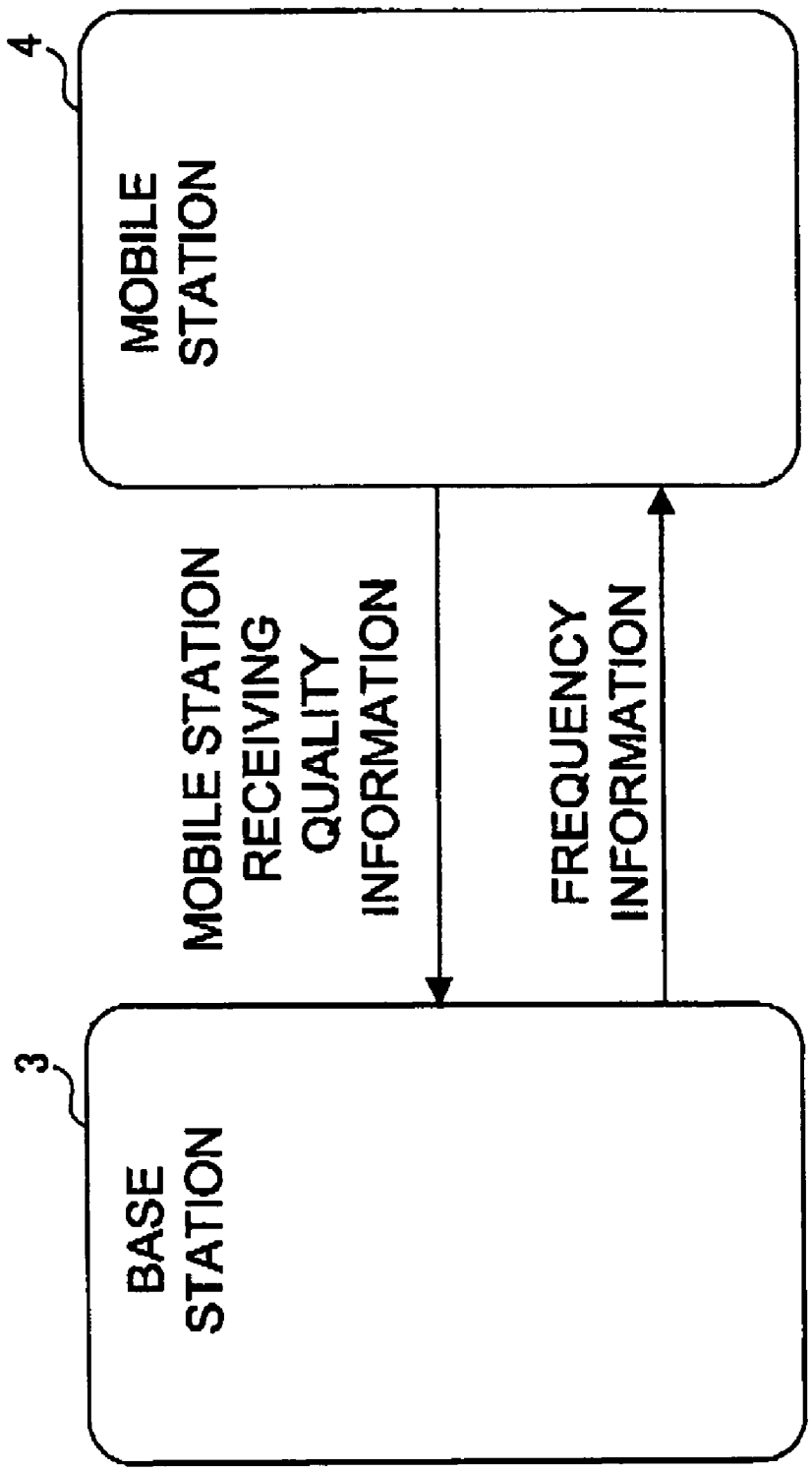
FIG. 8 is a block diagram showing the system configuration according to the embodiment of the present invention.

Next, the mobile communications system according to Embodiment 2 of the present invention is described with reference to FIG. 8.

The mobile communication system according to Embodiment 2 includes the base station 3 that further includes a frequency selection apparatus 35 that carries out the frequency selection. The mobile station 4 transmits received signal information to the base station 3, and the base station 3 specifies the system to be linked to and the frequency band to be used based on the received signal information of the mobile station 4, the received signal information of the base station 3, and the traffic information of the base station 3. The information about the selected frequency band and system is provided to the mobile station 4 as the frequency information, and communication is set up based on the frequency information.

Figure 9:
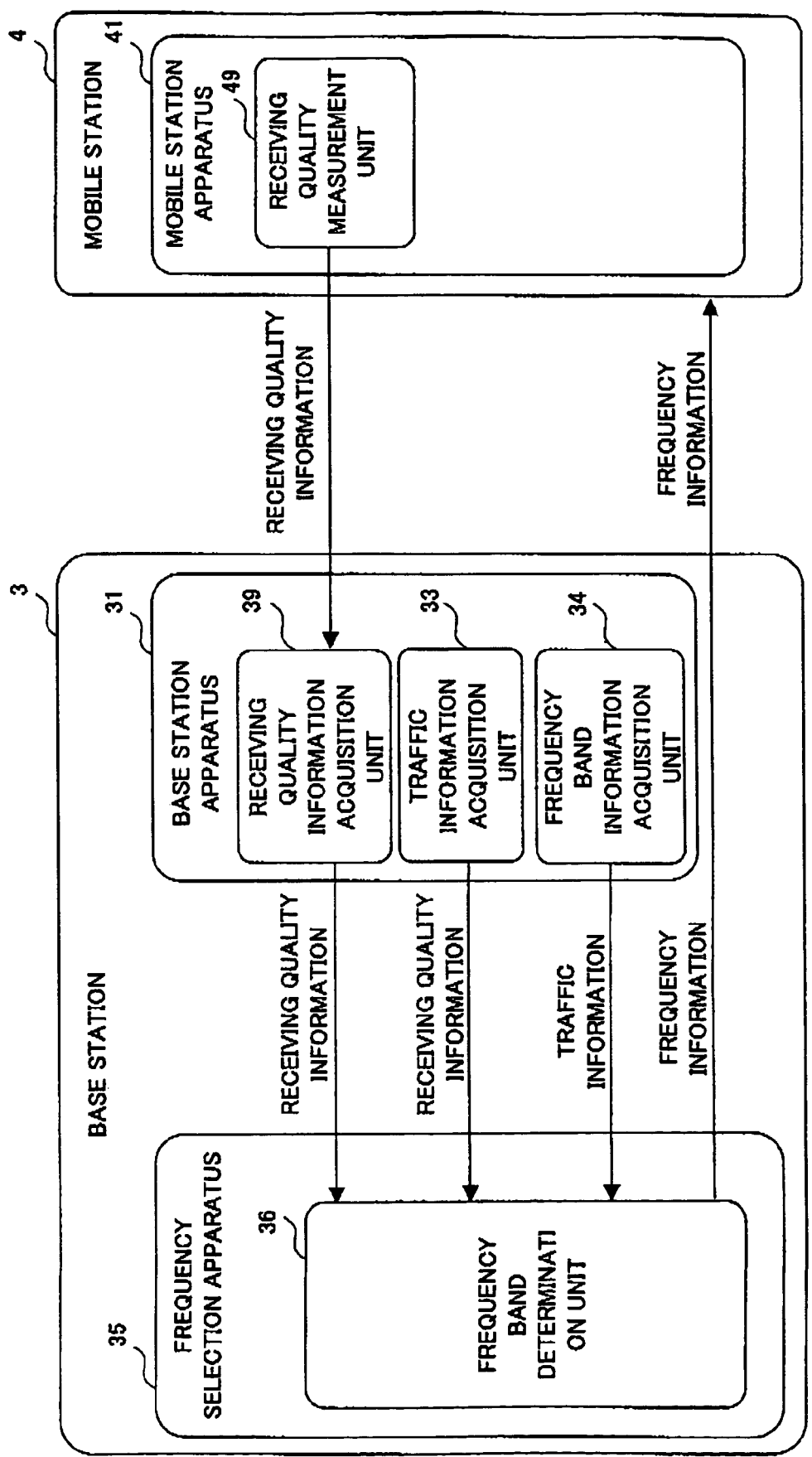
FIG. 9 is a block diagram showing the system configuration according to the embodiment of the present invention, and the relation to a control unit for explaining control thereof.

Details follow with reference to FIG. 9.

The base station 3 includes a frequency selection apparatus 35 in addition to the base station apparatus 31. The frequency selection apparatus 35 includes a frequency band determination unit 36. The frequency selection apparatus 35 performs frequency selection.

The received signal measurement unit 49 of the mobile station apparatus 41 of the mobile station 4 measures received signal and transmits it as mobile station information to the base station 3. The transmitted mobile station information is received by the received signal information acquisition unit 39 of the base station apparatus 31 of the base station 3, and the received signal information acquisition unit 39 extracts received signal information from the mobile station information and provides the received signal information to the frequency selection apparatus 35. Further, the received signal measurement unit 33 and the traffic measurement unit 34 of the base station apparatus 31 measure the received signal at the base station 3 and the amount of traffic accommodated by the base station 3, respectively, and provide the respective information to the frequency selection apparatus 35.

The frequency band determination unit 36 of the frequency selection apparatus 35 determines a frequency band to be used based on the threshold beforehand set up using the received signal information of the base station 3 and the mobile station 4, and the traffic information. Information about the determined frequency band is provided to the mobile station 4 as frequency band information. The mobile station 4 sets up communications based on the frequency band information.

Figure 10:
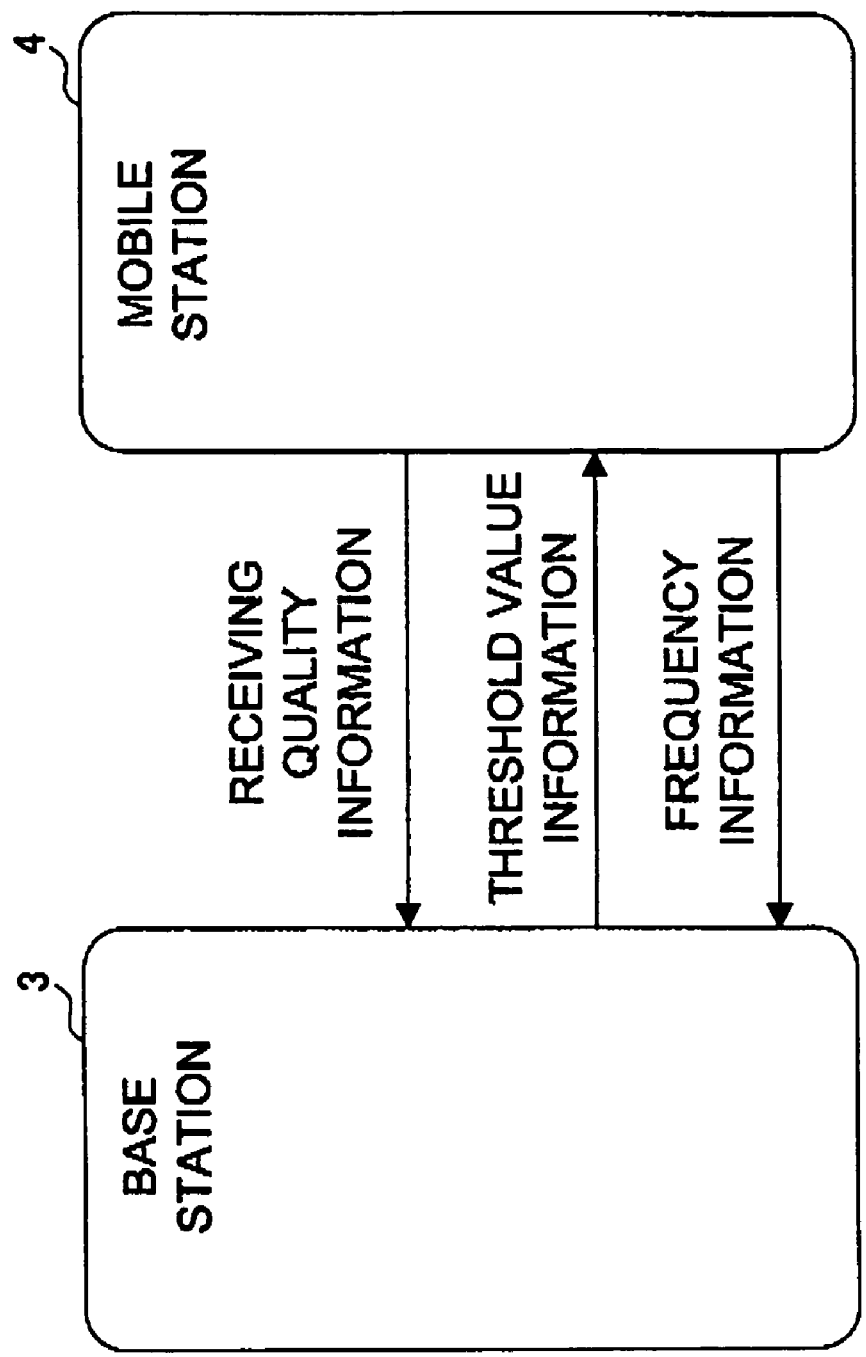
FIG. 10 is a block diagram showing the system configuration according to the embodiment of the present invention.

Next, the mobile communication system according to Embodiment 3 of the present invention is described with reference to FIG. 10.

According to the mobile communication system of Embodiment 3, the mobile station 4 includes a frequency selection apparatus 43 that carries out the frequency selection. The mobile station 4 transmits received signal information to the base station 3. Then, the base station 3 that receives the received signal information obtains a threshold value using the received signal information of the mobile station 4, the received signal information of the base station 3, and the traffic information of the base station 3. Then, the base station 3 transmits information about the threshold value to the mobile station 4.

The mobile station 4 determines a system to be connected to, and a frequency band to be used based on the transmitted threshold information. The information about the selected frequency band and the system is provided to the base station 3 from the mobile station 4, and communications are set up based on the information about the selected frequency band and the system.

Figure 11:
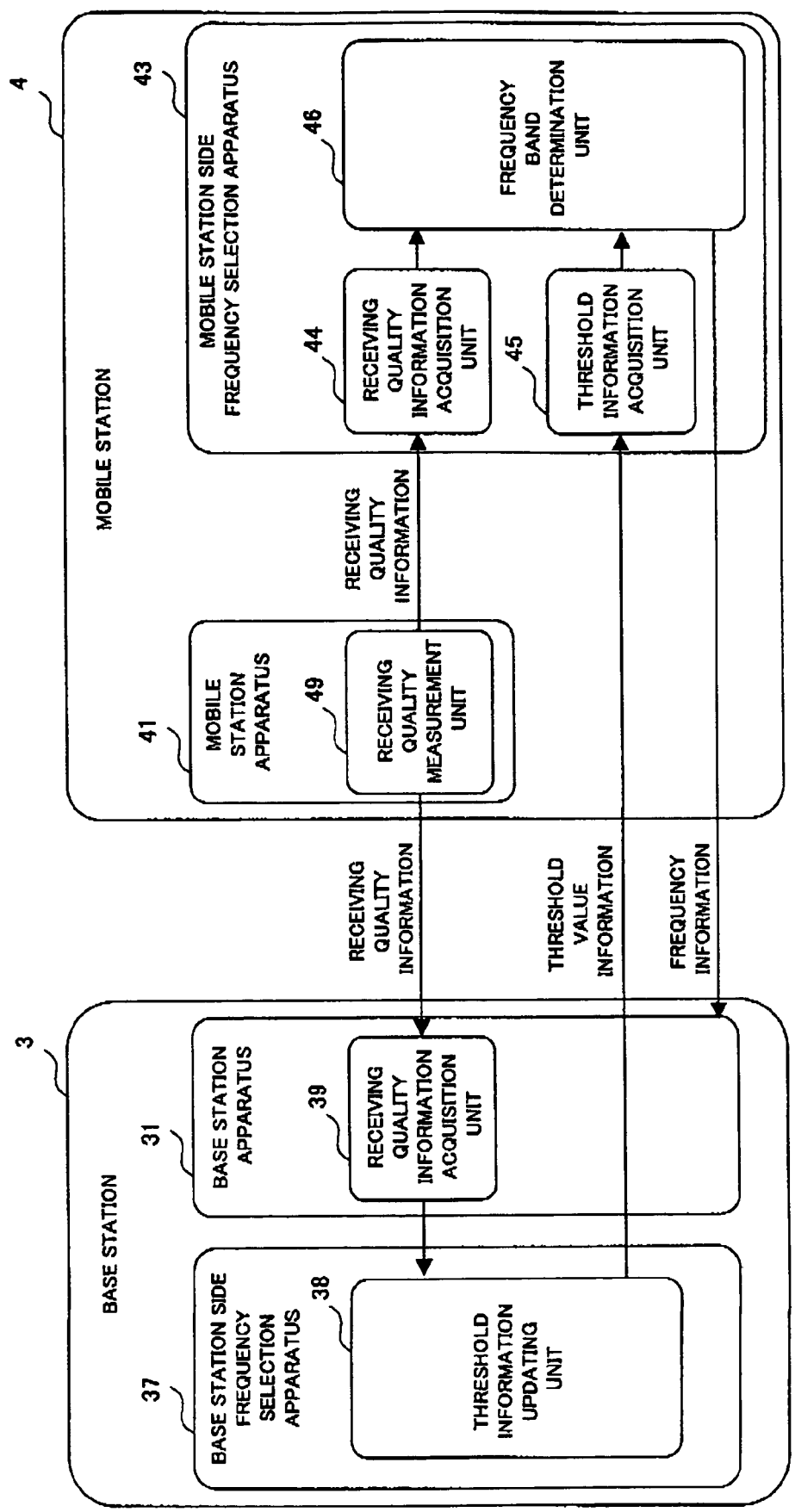
FIG. 11 is a block diagram showing the system configuration according to the embodiment of the present invention, and the relation to a control unit for explaining control thereof.

Details are described with reference to FIG. 11.

In addition to the base station apparatus 31, the base station 3 includes a base station side frequency selection apparatus 37 that further includes a threshold information updating unit 38.

In addition to the mobile station apparatus 41, the mobile station 4 includes the mobile station side frequency selection apparatus 43. The mobile station side frequency selection apparatus 43 includes a frequency band determination unit 46, a received signal information acquisition unit 44, and a threshold information acquisition unit 45 that is connected to the frequency band determination unit 46.

The received signal measurement unit 49 of the mobile station apparatus 41 of the mobile station 4 measures (the quality of) received signal, and transmits information about the received signal as mobile station information to the base station 3 and the received signal information acquisition unit 44 of the mobile station side frequency selection apparatus 43.

The received signal information acquisition unit 39 of the base station apparatus 31 of the base station 3 receives the mobile station information, and the received signal information acquisition unit 39 extracts the received signal information from the mobile station information and provides the received signal information to the threshold information updating unit 38 of the base station side frequency selection apparatus 37.

The threshold information updating unit 38 updates the threshold based on the information transmitted from each mobile station 4, and transmits the threshold information to the threshold information acquisition unit 44 of the mobile station side frequency selection apparatus 43 of the mobile station 4. Further, a received signal measurement unit (not illustrated) of the base station apparatus 31 measures (the quality of) received signal, and information about the measured received signal is transmitted to the received signal information acquisition unit 44.

The received signal information acquired from the base station apparatus 31 through the mobile station apparatus 41 is provided to the received signal information acquisition unit 44 of the mobile station side frequency selection apparatus 43 of the mobile station 4, and the threshold information is provided to the threshold information acquisition unit 45.

The received signal information acquisition unit 44 and the threshold information acquisition unit 45 provide respective input information to the frequency band determination unit 46, which then determines the frequency band to assign. The frequency band determination unit 46 provides information about the determined frequency band to the base station 3 as frequency information. The base station 3 sets up communications based on the frequency information.

Figure 12:
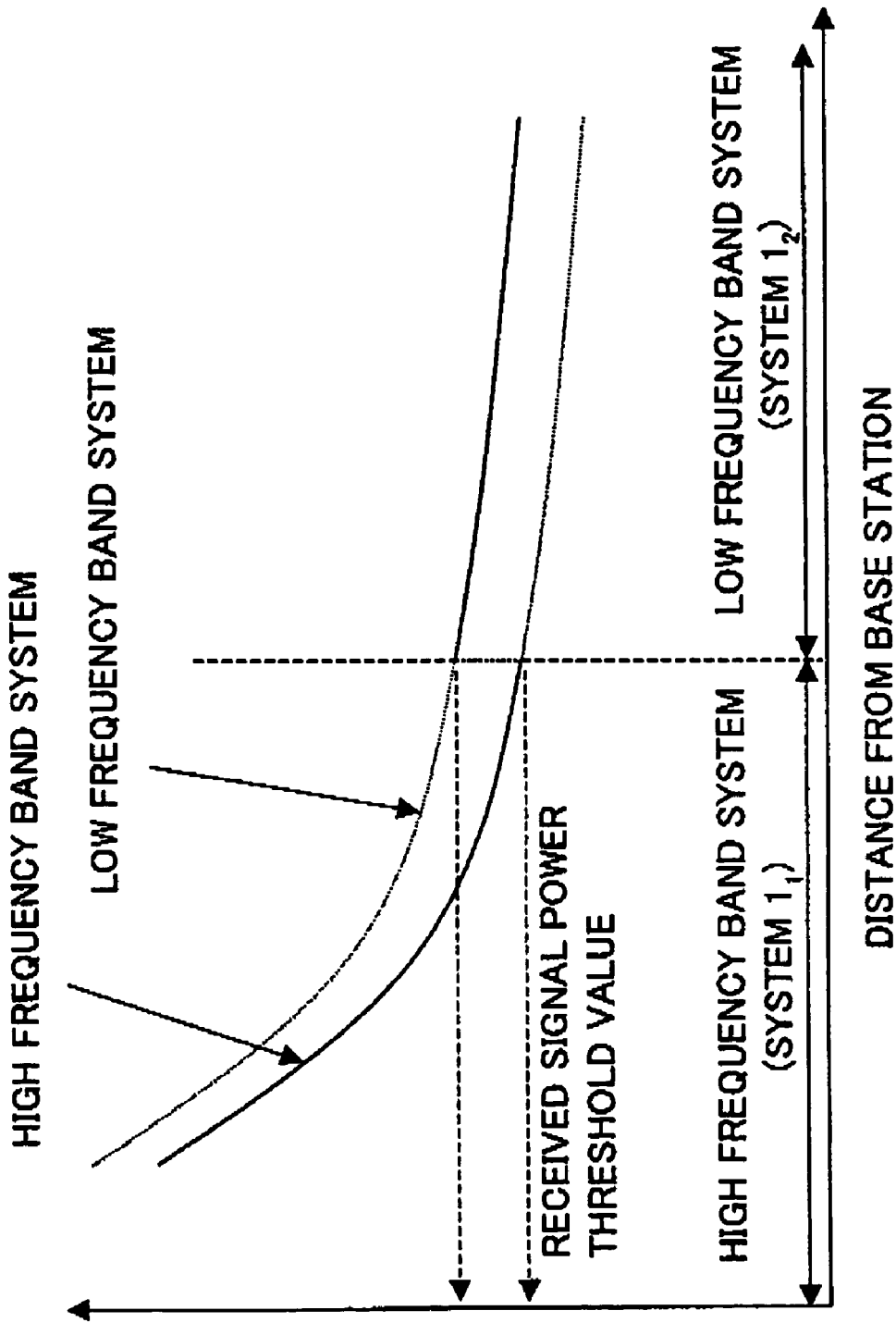
FIG. 12 gives graphs showing system allocation criteria based on received power.

Next, criteria of the threshold determination by received signal strength are described with reference to FIG. 12. Here, for simplicity of the description, a simple example is described, wherein one threshold value of received signal strength is set up, and all mobile stations are divided into two groups, a group consisting of mobile stations that are close to the base station 3, and the other group consisting of mobile stations that are distant from the base station 3.

The mobile station 4 is connected to the system $1_1$ using the higher frequency band when the value of received signal strength is greater than the threshold value of received signal strength. When the value of the received signal strength at the mobile station 4 is less than the received signal strength threshold, the mobile station 4 is connected to the system $1_2$ using the lower frequency band. However, when there is no channel available to be assigned in one system, as long as communication quality can be maintained, the other system is connected to.

Although the description above is made about a method wherein the threshold that is fixed is used, since the optimal value of a received signal strength threshold changes with traffic distribution and mobile station distribution, a method of adaptively controlling the threshold is possible. For example, the received signal strength at each mobile station and the number of mobile stations under communication (or traffic) are measured for every fixed time, and the threshold is adaptively controlled according to the number of mobile stations per frequency bandwidth. In this manner, the number of mobile stations or traffic per frequency bandwidth can be made constant.

Hereafter, the mobile communications systems according to Embodiments 1 through 3 are further described as Embodiments 4 through 11 in detail.

Figure 13:
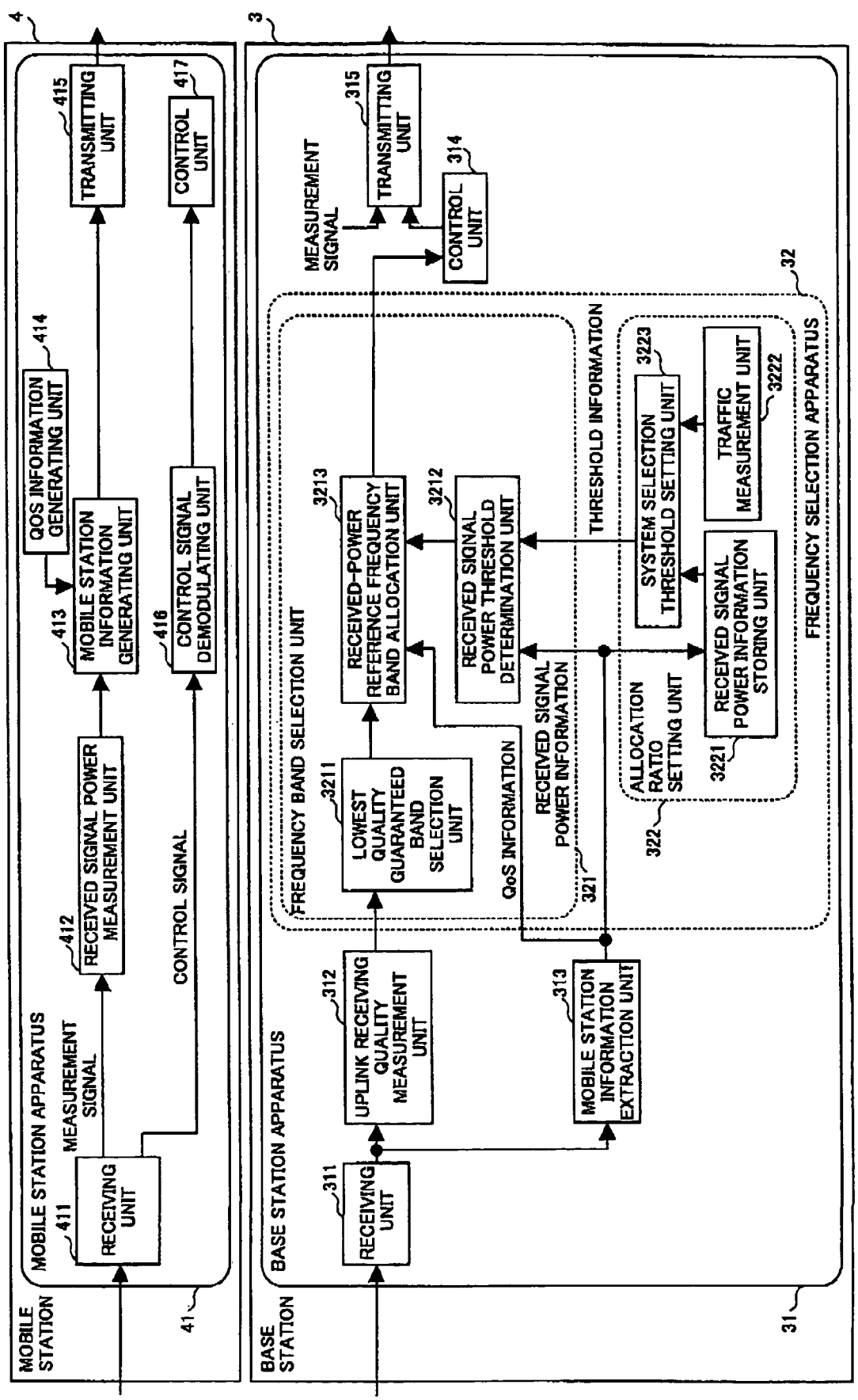
FIG. 13 is a block diagram showing the configuration of a mobile station and the base station according to the embodiment of the present invention.

The mobile communications system according to Embodiment 4 of the present invention is described with reference to FIG. 13.

The mobile communications system according to Embodiment 4 determines a frequency band by performing a threshold determination based on the received signal strength at the mobile station 4.

The mobile communications system according to Embodiment 4 includes the base station 3 and the mobile station 4.

The base station 3 includes the base station apparatus 31. The base station apparatus 31 includes a receiving unit 311; an uplink received signal measurement unit 312 and a mobile station information extraction unit 313 that are connected to the receiving unit 311; the frequency selection apparatus 32 that is connected to the uplink received signal measurement unit 312 and the mobile station information extraction unit 313; a control unit 314 connected to the frequency selection apparatus 32; and a transmitting unit 315 that is connected to the control unit 314, receives a measurement: signal, and transmits the measurement signal and a control signal. Further, the frequency selection apparatus 32 includes a frequency band selection unit 321, and an allocation ratio setting unit 322 connected to the frequency band selection unit 321. The frequency band selection unit 321 includes a minimum quality guaranteed band selection unit 3211 connected to the uplink received signal measurement unit 312; a received power reference frequency band allocation unit 3213 for allocating a frequency band based on received power, which is connected to the minimum quality guaranteed band selection unit 3211, the mobile station information extraction unit 313, and the control unit 314; and a received signal strength threshold determination unit 3212 connected to the received power reference frequency band allocation unit 3213 and the mobile station information extraction unit 313.

Further, the allocation ratio setting unit 322 includes a received signal strength information storing unit 3221 connected to the mobile station information extraction unit 313; a system selection threshold setting unit 3223 connected to the received signal strength information storing unit 3221 and the received signal strength threshold determination unit 3212; and a traffic measurement unit 3222 connected to the system selection threshold setting unit 3223.

Further, the mobile station apparatus 41 of the mobile station 4 includes a receiving unit 411, a received signal strength measurement unit 412 connected to the receiving unit 411, a mobile station information generating unit 413 connected to the received signal strength measurement unit 412, a QoS information generating unit 414 and a transmitting unit 415 connected to the mobile station information generating unit 413, a control signal demodulating unit 416 connected to the receiving unit 411, and a control unit 417 connected to the control signal demodulating unit 416.

When assigning a channel for communication between the mobile station 4 and the base station 3, the mobile station 4 starts measurement of a received signal based on the received signal measurement request from the base station 3. The receiving unit 411 of the mobile station 4 receives the signal transmitted from two or more base stations, extracts the received signal measurement signal from a base station that is a candidate base station to be connected to, and provides the received signal measurement signal to the received signal strength measurement unit 412. The received signal strength measurement unit 412 measures the received signal strength using the provided received signal measurement signal, and a measurement result is provided to the mobile station information generating unit 413.

Further, the QoS information generating unit 414 sets up QoS information of the mobile station 4 based on the communication quality required by the mobile station 4, and provides the QoS information to the mobile station information generating unit 413. The mobile station information generating unit 413 generates mobile station information based on the information about the received signal strength at the mobile station 4 and the QoS information, and provides the mobile station information to the transmitting unit 415. The transmitting unit 415 transmits the mobile station information as a control signal to the base station 3.

The base station 3 determines the channel, the frequency band, and the cellular system to be used for communication based on the received mobile station information, and provides a determination result to the mobile station 4 as a control signal.

The receiving unit 411 of the mobile station 4 extracts the control signal from the received signal that the connection candidate base station transmits, and provides the control signal to the control signal demodulating unit 416. The control signal demodulating unit 416 demodulates the control signal, extracts the information about the frequency band, the channel, and the cellular system to be connected to, which are determined by the base station 3, and provides the information to the control unit 417. Based on the input signal, the control unit 417 sets up the frequency band and the channel that are to be used for communication, and determines the cellular system to be connected to.

As for the base station 3, the receiving unit 311 receives the control signal transmitted from the mobile station 4. The received signal is provided to the uplink received signal measurement unit 312 and the mobile station information extraction unit 313. The uplink received signal measurement unit 312 measures the quality of the received signal such as the received signal strength, and provides the measured value to the minimum quality guaranteed band selection unit 3211. The minimum quality guaranteed band selection unit 3211 selects a system that satisfies the received signal strength required in order to establish communication based on the measured received signal strength, and provides the system as the minimum quality guarantee band information to the received power reference frequency band allocation unit 3213.

Further, the mobile station information extraction unit 313 extracts the mobile station information that includes the received signal strength information and the QoS information from the signal generated by the mobile station 4, and provides the extracted mobile station information to the received signal strength information storing unit 3221 and the received signal strength threshold determination unit 3212.

The received signal strength information storing unit 3221 stores the received signal strength information of all the mobile stations connected to the base station concerned. When the mobile station information and a system selection threshold value are provided to the received signal strength threshold determination unit 3212 from the system selection threshold setting unit 3223, the received signal strength threshold determination unit 3212 compares the received signal strength extracted from the mobile station information with the system selection threshold value, and provides a result of the comparison (i.e., threshold determination) to the received power reference frequency band allocation unit 3213.

The received power reference frequency band allocation unit 3213 selects a frequency band based on the QoS information, the minimum quality guarantee band information, and the result of the threshold determination, and provides information about the frequency band to the control unit 314 as a frequency band selection result. The control unit 314 that has received the frequency selection result starts communication control, and transmits the frequency band selection result to the mobile station 4 through the transmitting unit 315.

Next, a process carried out by the allocation ratio setting unit 322 is described. The allocation ratio setting unit 322 sets up the system selection threshold. The mobile station information is provided from the mobile station information extraction unit 313 of the base station 3 to the received signal strength information storing unit 3221 of the allocation ratio setting unit 322, and the received signal strength information of the mobile station concerned is recorded. Further, the received signal strength information storing unit 3221 provides the received signal strength information of all the mobile stations connected to the base station 3 concerned to the system selection threshold setting unit 3223. The traffic measurement unit 3222 measures the amount of traffic of the mobile stations connected to the base station 3 concerned, and provides the traffic information to the system selection threshold setting unit 3223.

The system selection threshold setting unit 3223 obtains the amount of resources (the number of channels) that is available of the base station concerned. Then, based on the available resources and the received signal strength information of each mobile station, the system selection threshold setting unit 3223 determines the system selection threshold value and provides the system selection threshold value to the received signal strength threshold determination unit 3212. Further details of the method of setting the threshold are described below.

Figure 14A:
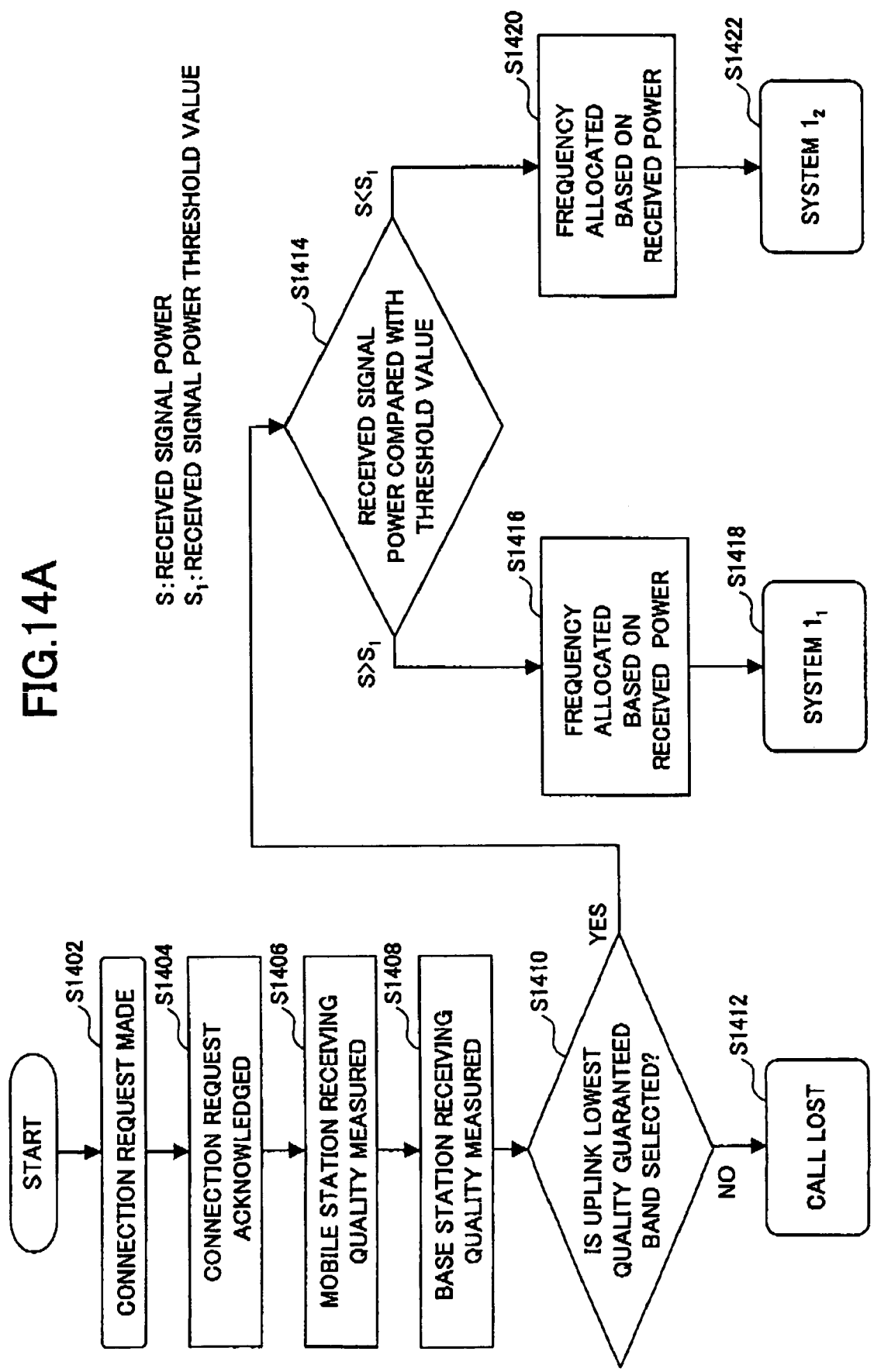
FIG. 14A is a flowchart of system selection according to the embodiment of the present invention.

Next, a process of system selection is described with reference to FIG. 14A.

A communication connection process is started at Step S1402 where a connection request is made. Then, at Step S1404, the connection request (call generation) is received.

Then, the received signal of the mobile station is measured at Step S1406, and the received signal of the base station is measured at Step S1408. Then, it is determined whether the received signal strength of the base station satisfies the minimum quality, and a candidate frequency band that is available is selected at Step S1410. If the received signal strength of the base station does not satisfy the minimum quality, i.e., NO at Step S1410, the call is lost at Step S1412.

Otherwise, i.e., if the received signal strength of the base station satisfies the minimum quality, i.e., YES at Step S1410, the received signal strength of the mobile station is compared with a received signal strength threshold $S_1$ at Step S1414. If the received signal strength S of the mobile station is greater than the received signal strength threshold $S_1$, i.e., $S > S_1$ at Step S1414, the high frequency band is selected for communication between the base station and the mobile station, and connection is established to a system that uses the high frequency band at Step S1416. Consequently, the system $1_1$ is assigned at Step S1418. Here, S represents the received signal strength of the mobile station, and $S_1$ represents the received signal strength threshold.

Otherwise, if the received signal strength of the mobile station is less than the received signal strength threshold, i.e., $S < S_1$ at Step S1414, a low frequency band is selected for communication between the base station and the mobile station, and connection is established to a system that uses a low frequency band at Step S1420. Consequently, the system $1_2$ is assigned at Step S1422.

Figure 14B:
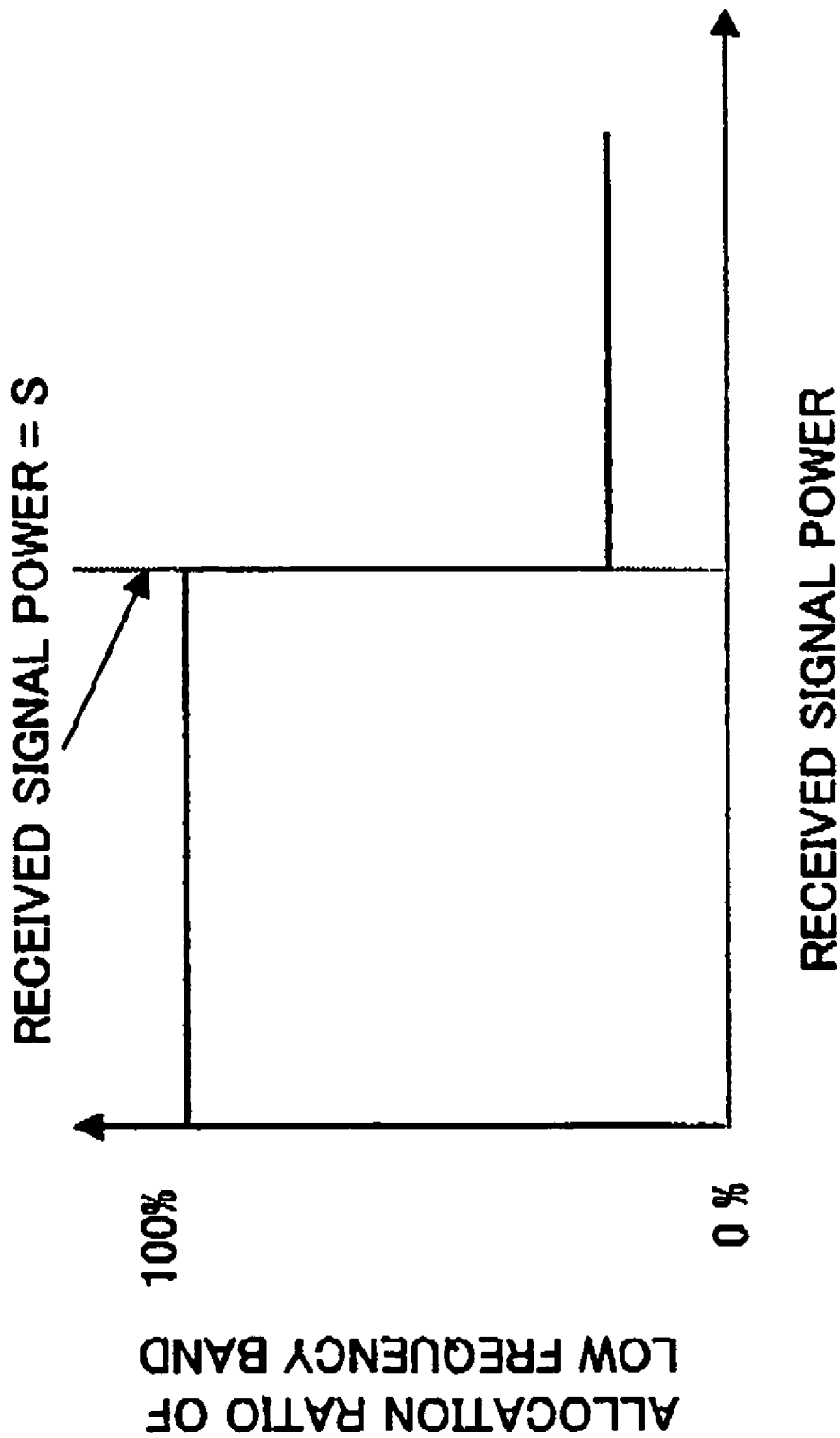
FIG. 14B is a graph showing a system allocation ratio to a low frequency band system.

FIG. 14B shows a relation between the received signal strength and the rate of allocation of the low frequency band system, wherein a frequency band is assigned based on the received signal strength after the connection request. Since the determination is carried out solely based on the received signal strength, the mobile station is connected to the system $1_1$ when the received signal strength $S_1$ is greater than S, and connected to the system $1_2$ when S1 is less than S.

Figure 15:
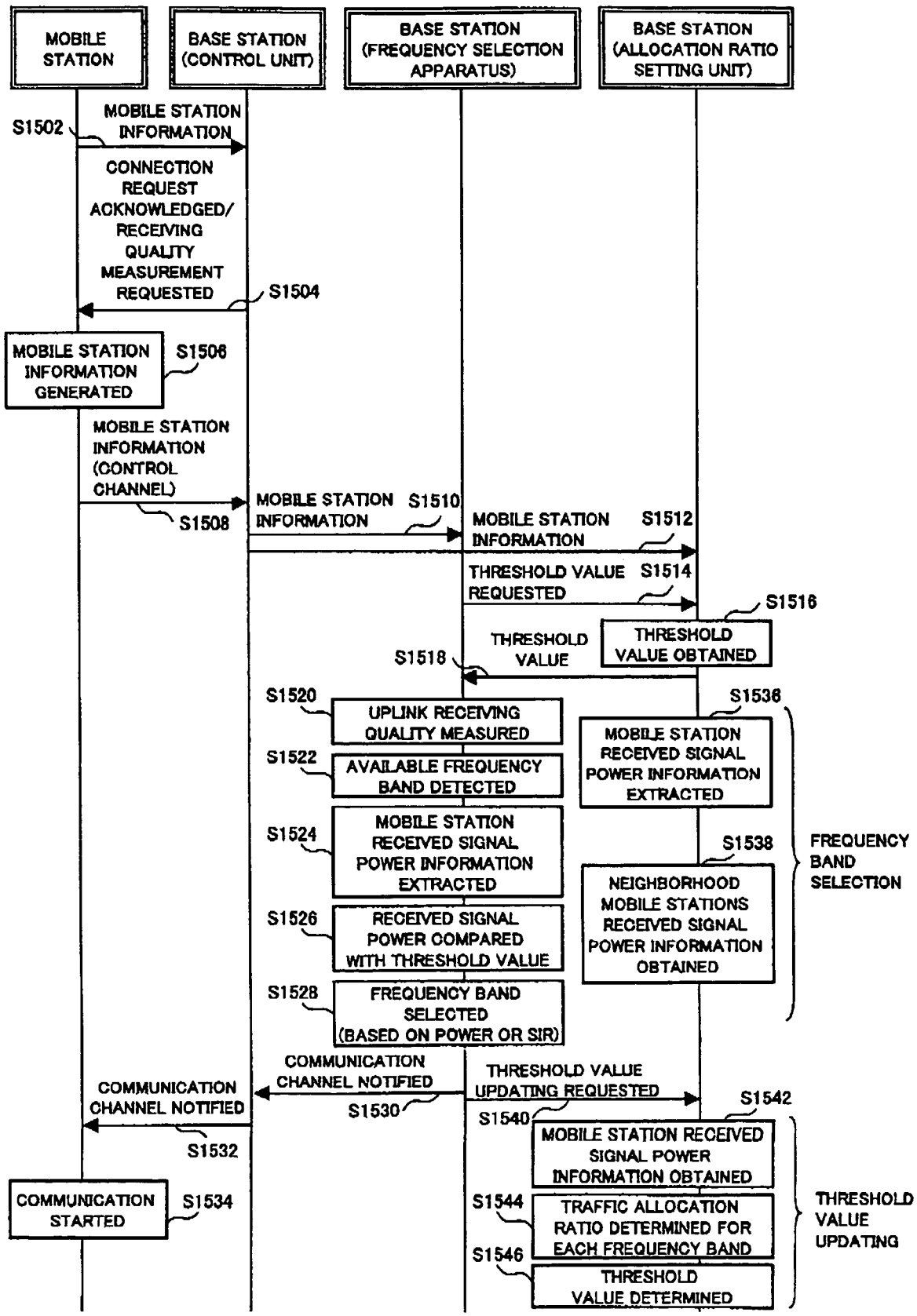
FIG. 15 is a flowchart showing control flows of the frequency band selection and threshold updating according to the embodiment of the present invention.

Next, the frequency band selection method and the threshold updating control method of the mobile communications system according to this Embodiment are described with reference to FIG. 15. Here, an example when a connection request is made by a mobile station is described.

When a connection is requested, the mobile station 4 transmits a connection request to the control unit of the base station 3 (Step S1502), and the connection request acknowledgement signal that acknowledges the receipt of the request is transmitted from the base station 3 to the mobile station 4 (Step S1504).

Next, the mobile station 4 generates mobile station information including the SIR information about the received signal strength measured based on the signal received from the base station 3, and QoS information (Step S1506), and transmits the mobile station information to the control unit 314 of the base station apparatus 31 as a control channel signal (Step S1508). The control unit 314 transmits the mobile station information to the frequency band selection unit 321 of the frequency selection apparatus 32, and the allocation ratio setting unit 322 (Step S1510 and Step S1512).

The frequency band selection unit 321 requests threshold information of the allocation ratio setting unit 322 (Step S1514). The allocation ratio setting unit 322 acquires the threshold information (Step S1516), and provides the acquired threshold information to the frequency band selection unit 321 (Step S1518).

Having received the mobile station information, the frequency band selection unit 321 determines whether the received signal strength is sufficient for communication (Step S1522) by measuring the received signal of the uplink, e.g., received signal strength (Step S1520). Next, based on the mobile station information provided by the mobile station 4, the received signal strength value of the mobile station 4 is extracted (Step S1524), the threshold determination of the extracted received signal strength value is carried out by comparing the received value with the received signal strength threshold (Step S1526), and a frequency band is selected (Step S1528). A communication channel is specified by providing information about the selected frequency band to the mobile station through the control unit as frequency band information (Step S1530 and Step S1532). The mobile station 4 sets up communications and starts communicating (Step S1534).

The threshold updating process carried out by the allocation ratio setting unit 322 of the base station 3 is described.

When updating the threshold, the received signal strength information about all the mobile stations connected to the base station is used, which received signal strength information is obtained from the received signal strength at the mobile station 4 contained in the mobile station information provided by the mobile station 4 through the control unit 314 of the base station 3, and the received signal strength information of neighborhood mobile stations acquired from the received signal strength information storing unit 3221.

The allocation ratio setting unit 322 extracts the received signal strength information of the mobile station (Step S1536), and acquires the received signal strength information of neighborhood mobile stations (Step S1538).

When a request for updating the threshold is transmitted from the frequency band selection unit 321 (Step S1540), the allocation ratio setting unit 322 acquires the received signal strength information of the mobile station (Step 1542).

Then, the system selection threshold setting unit 3223 obtains the number of available channels of each frequency band based on the traffic information of each frequency band at the base station concerned, the traffic being measured by the traffic measurement unit 3222. The traffic is distributed to each band based on the number of available channels of each band, and the ratio of the traffic to be assigned to two frequency bands is set up (Step S1544). In this case, the distribution of received signal strength can be obtained from the received signal strength information. Next, the threshold is determined (Step S1546).

The method of setting up the threshold is as follows. A first ratio of the available frequency bandwidths of the respective systems is obtained. When the threshold determination is carried out at each mobile station, a second ratio of the bandwidth assigned to mobile stations that receive signal strength exceeding the threshold to the bandwidth assigned to mobile stations that receive signal strength below the threshold is obtained. Then, the threshold is set up so that the first ratio becomes equal to the second ratio. For example, when the available frequency bandwidth of the high frequency band system and the available frequency bandwidth of the low frequency band system are set the same, the threshold is set such that 50% of the mobile stations are assigned to the high frequency band and the other 50% of the mobile stations are assigned to the low frequency band. The threshold value determined by the system selection threshold setting unit 3223 is provided to the frequency band selection unit 321, and threshold updating is performed.

Figure 16:
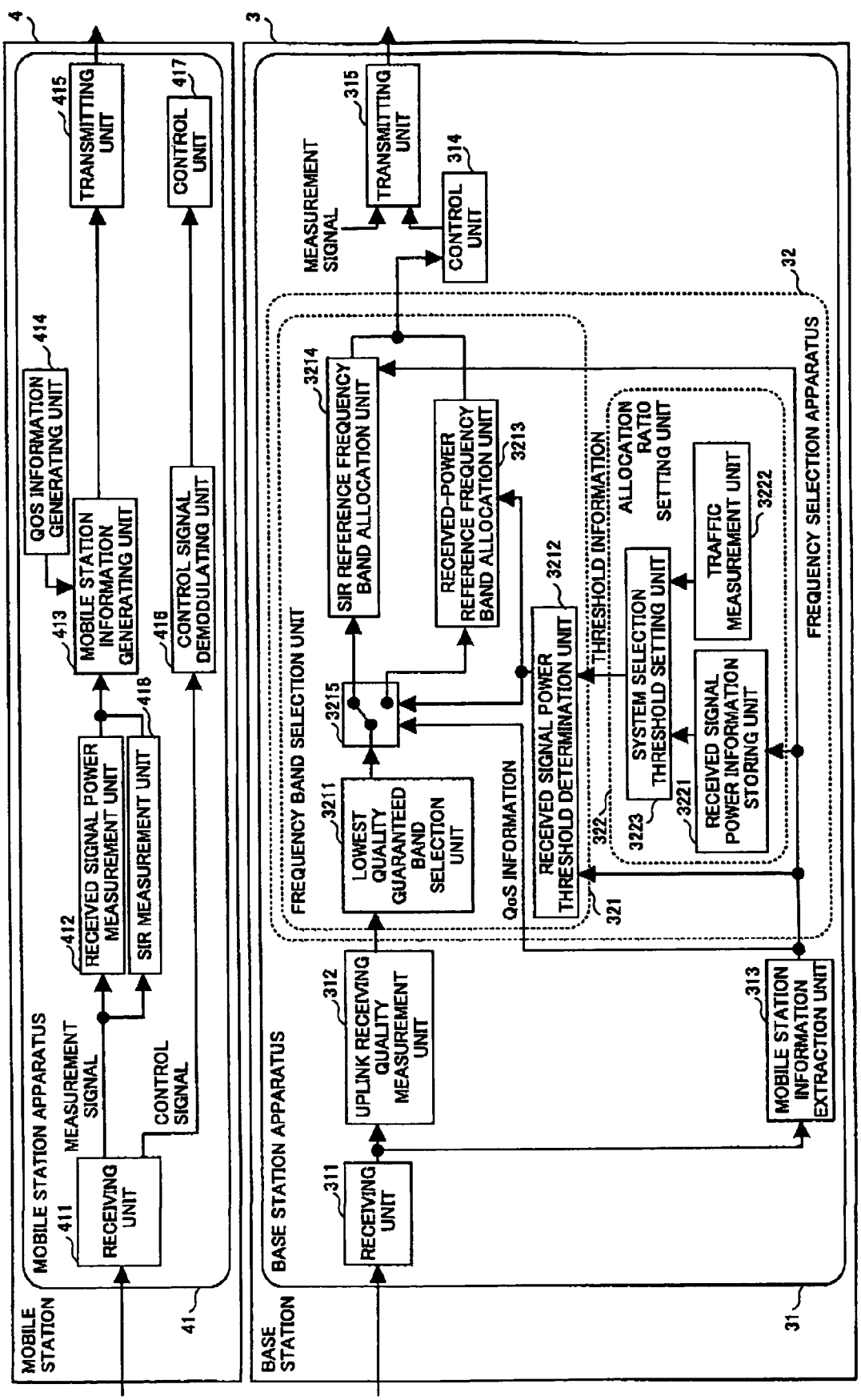
FIG. 16 is a block diagram showing the configuration of a mobile station and the base station according to the embodiment of the present invention.

Next, the mobile communications system according to Embodiment 5 of the present invention is described with reference to FIG. 16.

The mobile communications system according to Embodiment 5 determines the frequency band to be used and the system to be connected to based on threshold values with reference to the received signal strength and the SIR of the mobile station 4.

The mobile station 4 according to Embodiment 5 includes an SIR measurement unit 418 in addition to the mobile station described with reference to FIG. 13, the SIR measurement unit 418 being connected to the receiving unit 411 and the mobile station information generating unit 413.

Further, the base station 3 according to this Embodiment includes an SIR reference frequency band allocation unit 3214 for allocating a frequency band based on SIR in addition to the base station 3 described with reference to FIG. 13, the SIR reference frequency band allocation unit 3214 being connected to the control unit 314 and the mobile station information extraction unit 313. The base station 3 further includes a switching unit 3215 for switching a connection of the minimum quality guaranteed band selection unit 3211 to one of the SIR reference frequency band allocation unit 3214 and the received power reference frequency band allocation unit 3213. Further, the mobile station information extraction unit 313 and the received signal strength threshold determination unit 3212 are connected to the switching unit 3215.

When assigning a channel for communication between the mobile station 4 and the base station 3, the mobile station 4 starts measurement of the received signal based on the received signal measurement request from the base station 3. The receiving unit 411 of the mobile station 4 receives the signal transmitted from two or more base stations, extracts the received signal measurement signal from a candidate base station to be connected to, and provides the signal to the received signal strength measurement unit 412, the SIR measurement unit 418, and the control signal demodulating unit 416. Then the received signal strength measurement unit 412 and the SIR measurement unit 418 measure received signal strength and SIR, respectively, and provide measurement results to the mobile station information generating unit 413 as received signal strength information and SIR information, respectively. Furthermore, the QoS information generating unit 414 sets up QoS information of the mobile station 4 based on the communication quality that the mobile station 4 requires, and provides the QoS information to the mobile station information generating unit 413. The mobile station information generating unit 413 generates mobile station information using the received signal strength information, the SIR information, and the QoS information of the mobile station 4, and provides the mobile station information to the transmitting unit 415, The transmitting unit 415 transmits the mobile station information serving as a control signal to the base station 3.

The base station 3 determines the channel to be used for communication, the frequency band thereof, and the cellular system to connect to based on the mobile station information, and provides the information to the mobile station 4 as a control signal.

The receiving unit 411 of the mobile station 4 extracts the control signal from the received signal that the candidate base station transmits, and provides the control signal to the control signal demodulating unit 416. The control signal demodulating unit 416 demodulates the provided control signal, extracts the information about the frequency band, the channel, and the cellular system to connect to that the base station 3 has determined, and provides the information to the control unit 417. Based on the information provided, the control unit 417 sets up the frequency band and the channel that are to be used for communication, and determines the cellular system to connect to.

On the other hand, the receiving unit 311 of the base station 3 receives the signal transmitted by the mobile station 4, and provides the received signal to the uplink received signal measurement unit 312 and the mobile station information extraction unit 313.

The uplink received signal measurement unit 312 measures the quality of the received signal, for example, received signal strength of the received signal, and provides a received signal strength value to the minimum quality guaranteed band selection unit 3211. The minimum quality guaranteed band selection unit 3211 selects a system that satisfies received signal strength required in order to establish communication, and acquires the minimum quality band guarantee information.

The mobile station information extraction unit 313 extracts the mobile station information that includes received signal strength information, SIR information, and QoS information from the received signal, and provides the extracted mobile station information to the received signal strength information storing unit 3221, the received signal strength threshold determination unit 3212, and the SIR reference frequency band allocation unit 3214.

When a system selection threshold from the system selection threshold setting unit 3223 and the mobile station information are provided to the received signal strength threshold determination unit 3212, the received signal strength threshold determination unit 3212 performs a threshold determination, and obtains a threshold determination result using the received signal strength information extracted from mobile station information and the above-mentioned system selection threshold. Next, the switching unit 3215 selects one of the SIR reference frequency band allocation unit 3214 and the received power reference frequency band allocation units 3213 based on the threshold determination result, the QoS information, and the minimum quality guarantee band information.

When the SIR reference frequency band allocation unit 3214 is selected, a frequency band having the highest value of SIR of the mobile station in each system is selected. On the other hand, when the received power reference frequency band allocation unit 3213 is selected, the threshold determination result based on received signal strength determines the frequency band.

Information about the selected frequency band is provided to the control unit 314 as a frequency band selection result. The control unit 314 provides the frequency band selection result to the transmitting unit 315 while performing communication control and starting the communication. The transmitting unit 315 transmits the frequency band selection result and the received signal measurement signal to the mobile station 4. In addition, threshold updating is performed according to the same method as Embodiments described above.

Figure 17:
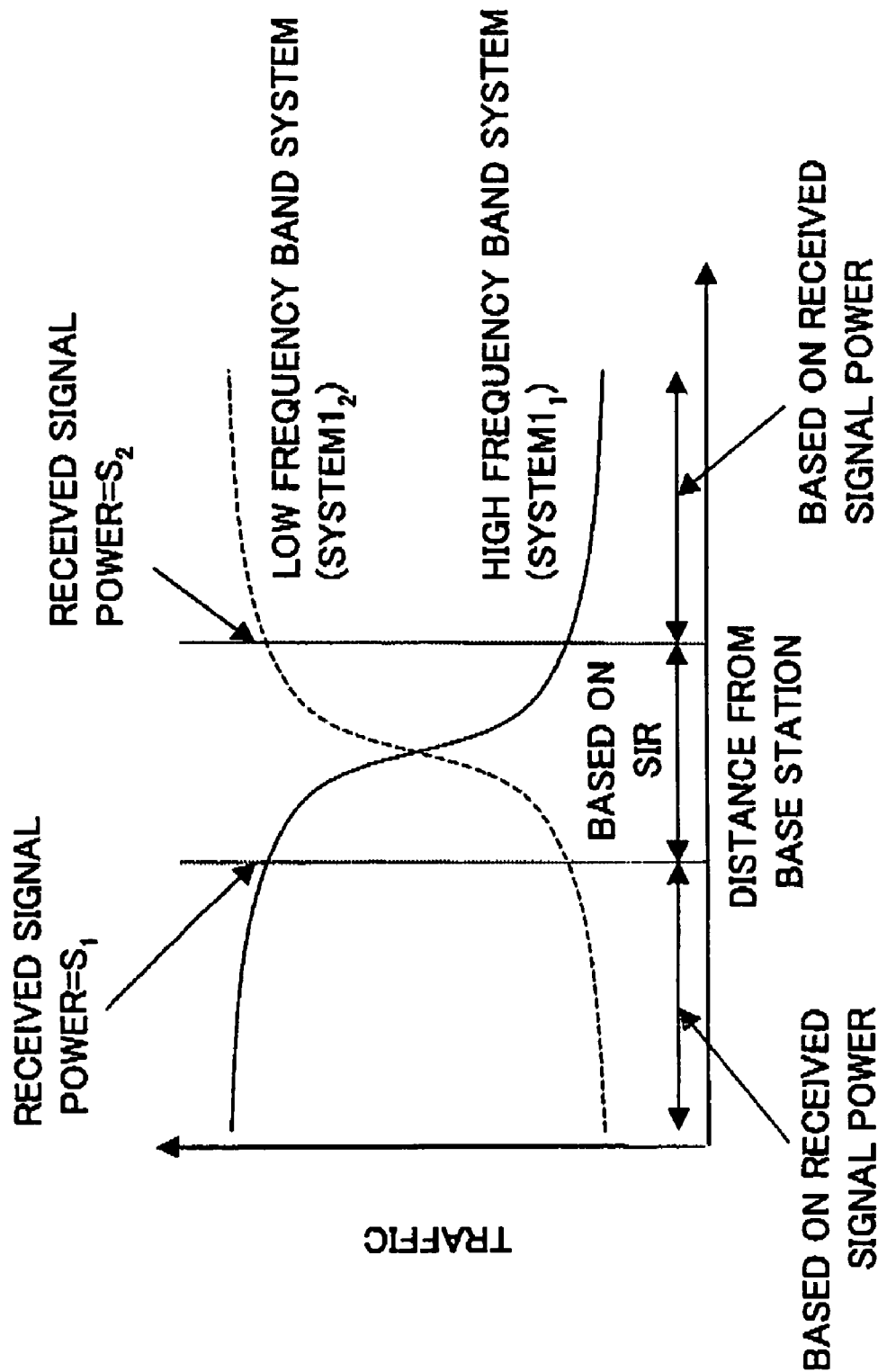
FIG. 17 gives graphs showing a ratio of traffic to a distance from the base station in the system selection using received power criteria and SIR criteria.

Next, a relation between the traffic and the distance from the base station 3 is described with reference to FIG. 17 in the case of the present Embodiment wherein the system assignment is based on either the received signal strength or SIR. When the received signal strength is less than $S_1$, the rate of the traffic of the system $1_1$ is high, and when the received signal strength exceeds $S_2$, the rate of the traffic of the system $1_2$ becomes high. When the received signal strength S is greater than $S_1$ and less than $S_2$, i.e., $S_1<S<S_2$, the traffic of the system $1_1$ becomes the higher as the distance from the base station 3 is the less; and the traffic of the system $1_2$ becomes the higher as the distance gets the greater.

Next, a process of system selection according to this Embodiment is described with reference to FIG. 18A. The process starts with Step S1802 wherein a connection request is made. Then, at Step S1804, the request is received.

Next, measurements of the received signal of the mobile station 4 and the base station 3 are performed at Step S1806 and Step S1808, respectively. Next, it is determined whether the received signal strength of the base station satisfies the minimum quality, and a candidate frequency band that can be used is selected at Step S1810.

If the received signal strength of the base station does not satisfy the minimum quality, i.e., NO at Step S1810, the call is lost (Step S1812).

Otherwise, if the received signal strength of the base station satisfies the minimum quality, i.e., YES at Step S1810, the received signal strength S of the mobile station is compared with received signal strength threshold values $S_1$ and $S_2$ (Step S1814). When the received signal strength S of the mobile station satisfies $\{S<S_1\} \cup \{S>S_2\}$, i.e., $S<S_1$, $S>S_2$ at Step S1814, the connection is made using the threshold determination result based on the received signal strength (Step S1816). Further, if the received signal strength S of the mobile station satisfies $\{S<S_1\}$, i.e., $S<S_1$ at Step S1816, connection to the system using a high frequency band is determined as the communication between the base station 3 and the mobile station 4 (Step S1818). Consequently, the system $1_1$ is assigned (Step S1820).

When the received signal strength S of the mobile station 4 satisfies $\{S>S_2\}$, i.e., $S>S_2$ at Step S1816, connection to a system using a low frequency band is determined as the communication between the base station 3 and the mobile station 4 (Step S1822). Consequently, the system $1_2$ is assigned (Step S1826).

Otherwise, if the received signal strength S of the mobile station 4 satisfies $\{S_1<S<S_2\}$, i.e., $S_1<S<S_2$ at Step S1824, connection is made to a system having a frequency band that provides a higher SIR for communication between the base station 3 and the mobile station 4 (Step S1824). When $SIR_1>SIR_2$ (i.e., $SIR_1>SIR_2$ at Step S1826), the system $1_1$ is assigned (Step S1820), and when $SIR_1<SIR_2$ ($SIR_1<SIR_2$ at Step S1826), the system $1_2$ is assigned (Step S1826). Here, $SIR_1$ represents the reception SIR of the system $1_1$, and $SIR_2$ represent the reception SIR of the system $1_2$.

Next, a relation between the allocation ratio of a system using the low frequency band and the received signal strength according to this Embodiment is described with reference to FIG. 18B.

A mobile station with low received signal strength is assigned to the system $1_1$, and the mobile station 4 with high received signal strength is assigned to the system $1_2$. In this manner, the systems are assigned in consideration of propagation of frequency. On the other hand, when the received signal strength S serves as S1<S<S2, the system selection is carried out base on the SIR; namely, the lower the SIR is, the lower the ratio of the mobile stations being assigned to the system using the high frequency.

Figure 19:
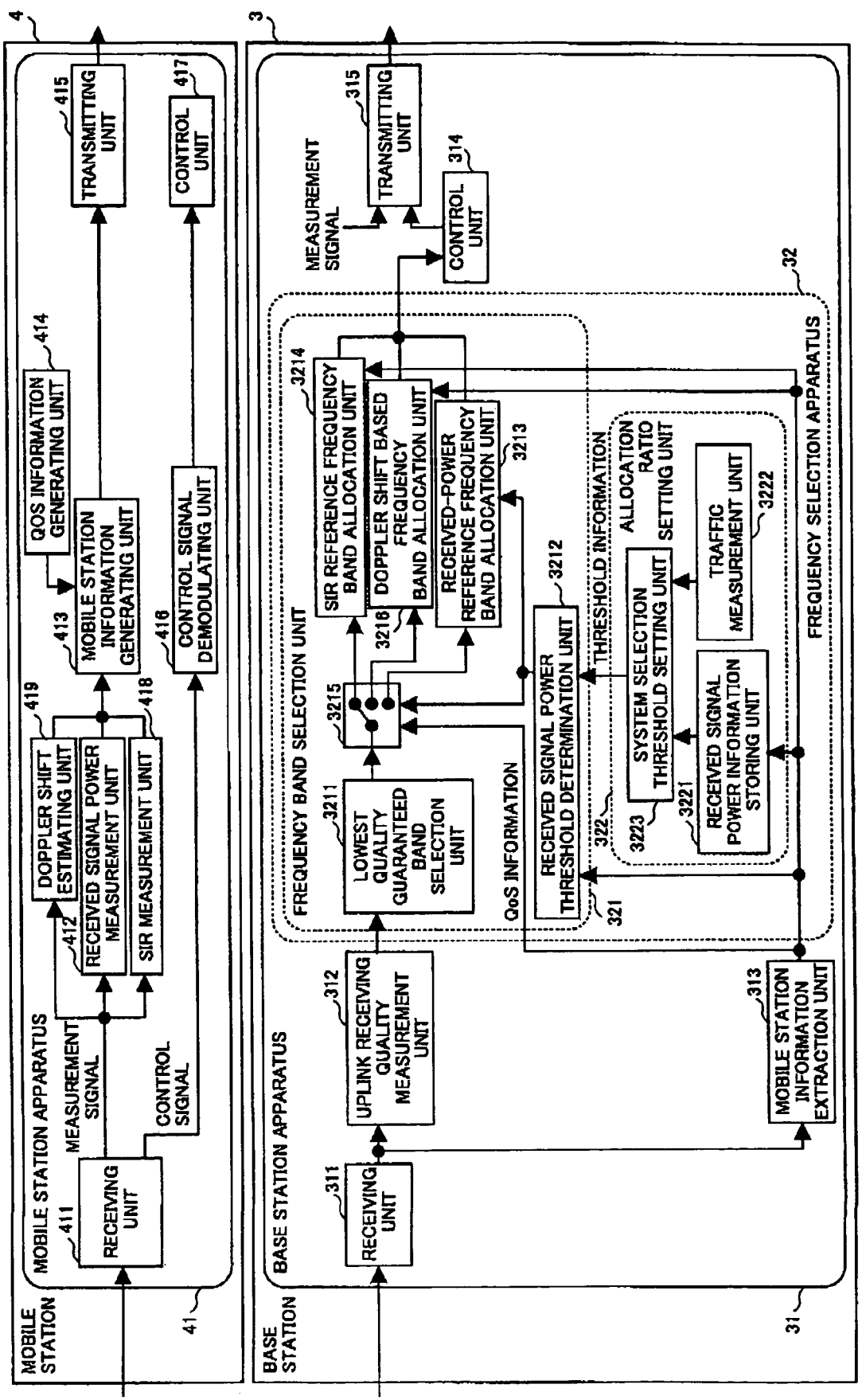
FIG. 19 is a block diagram showing the configuration of the mobile station and the base station according to the embodiment of the present invention.

Next, the mobile communications system according to Embodiment 6 of the present invention is described with reference to FIG. 19.

The mobile communications system according to this Embodiment determines a frequency band by carrying out a threshold determination based on the received signal strength at the mobile station 4, the SIR value, and Doppler shift at the base station 3. The amount of Doppler shift can be obtained by counting the number of level crossings per unit time of the envelope of the received signal, the level crossings occurring when the envelope crosses a predetermined level (for example, Non-Patent Reference 6 refers). Alternatively, the amount of Doppler shift can be obtained by an autocorrelation of the received signal.

The mobile station 4 according to this Embodiment includes a Doppler shift estimating unit 419, in addition to the mobile station 4 described with reference to FIG. 16, being connected to the receiving unit 411 and the mobile station information generating unit 413. Further, the base station 3 includes a Doppler shift reference frequency band allocation unit 3216 connected to the mobile station information extraction unit 313 and the control unit 314, in addition to the base station 3 described with reference to FIG. 16. Further, the switching unit 3215 switches such that one of the SIR reference frequency band allocation unit 3214, the Doppler shift reference frequency band allocation unit 3216, and the received power reference frequency band allocation unit 3213 is connected to the minimum quality guaranteed band selection unit 3211.

When assigning a channel for communication between the mobile station 4 and the base station 3, the mobile station 4 starts measurement of the received signal in response to the received signal measurement request from the base station 3. The receiving unit 411 of the mobile station 4 receives signals transmitted from two or more base stations 3, and inputs the signals to the received signal strength measurement unit 412, the SIR measurement unit 418, and the Doppler shift estimating unit 419 using the received signal measurement signal from a candidate base station 3. Using the received signal measurement signal, the received signal strength measurement unit 412, the SIR measurement unit 418, and the Doppler shift estimating unit 419 extract the received signal strength information, the SIR information, and the Doppler shift estimate, respectively, and provide them (the extracted results) to the mobile station information generating unit 413.

Further, the QoS information generating unit 414 generates the mobile station QoS information based on the communication quality requested by the mobile station 4, and provides the mobile station QoS information to the mobile station information generating unit 413.

The mobile station information generating unit 413 generates the mobile station information based on the received signal strength information at the mobile station 4, the SIR information, the Doppler shift information, and the QoS information. The generated mobile station information is provided to the transmitting unit 415. The transmitting unit 415 transmits the mobile station information to the base station 3 as the control signal.

The base station 3 determines the channel to be used for communication, the frequency band, and the cellular system to be connected based on the mobile station information, and provides information thereof to the mobile station 4 as the control signal.

The receiving unit 411 of the mobile station 4 extracts the control signal from the received signal that the candidate base station transmits, and provides the control signal to the control signal demodulating unit 416. The control signal demodulating unit 416 demodulates the control signal, extracts the information about the frequency band, the channel, and the cellular system to connect to determined by the base station 3, and provides the extracted information to the control unit 417. Based on the extracted information, the control unit 417 sets up the frequency band and the channel to be used for communication, and determines the cellular system to connect to.

On the other hand, the receiving unit 311 of the base station 3 receives the signal transmitted by the mobile station 4. The receiving unit 311 provides the received signal to the uplink received signal measurement unit 312 and the mobile station information extraction unit 313. The uplink received signal measurement unit 312 performs signal strength measurement of the signal, and provides a measured value to the minimum quality guaranteed band selection unit 3211. The minimum quality guaranteed band selection unit 3211 measures received signal strength, selects a system that satisfies received signal strength required in order to establish communication, and outputs minimum quality guarantee band information.

On the other hand, the mobile station information extraction unit 313 extracts the mobile station information that contains the received signal strength information, the SIR information, the Doppler shift information, and the QoS information from the signal generated by the mobile station 4, and provides the extracted mobile station information to the received signal strength information storing unit 3221, the received signal strength threshold determination unit 3212, the SIR reference frequency band allocation unit 3214, and the Doppler shift reference frequency band allocation unit 3216. The received signal strength information storing unit 3221 stores the received signal strength information of all the mobile stations 4 linked to the base station 3 obtained from the mobile station information. When the received signal strength threshold determination unit 3212 receives the mobile station information and a system selection threshold from the system selection threshold setting unit 3223, it performs threshold determination comparing the received signal strength information extracted from the mobile station information with the above-mentioned system selection threshold, and obtains a threshold determination result.

The switching unit 3215 selects one of the SIR reference frequency band allocation unit 3214, the received power reference frequency band allocation unit 3213, and the Doppler shift reference frequency band allocation unit 3216 based on the threshold determination result, the Doppler shift information, the QoS information, and the minimum quality band guarantee information.

When the SIR reference frequency band allocation unit 3214 is selected, the SIR reference frequency band allocation unit 3214 selects a frequency band that provides the highest receiving SIR value of the mobile station in each system. When the received power reference frequency band allocation unit 3213 is selected, the received power reference frequency band allocation unit 3213 selects a frequency band based on the above-mentioned threshold determination result. When the Doppler shift reference frequency band allocation unit 3216 is selected, the Doppler shift reference frequency band allocation unit 3216 performs allocation according to the amount of Doppler shift. For example, when the amount of Doppler shift is great, the system using a low frequency band is selected, and when the amount of Doppler shift is small, the system using a high frequency band is selected.

The selection result of the frequency band is provided to the control unit 314 as a frequency band selection result. The control unit 314 provides the frequency band selection result to the transmitting unit 315 while performing communication control and starting communication. The transmitting unit 315 transmits the frequency band selection result and the signal for received signal measurement at the mobile station 4 to the mobile station 4. Further, threshold updating is performed by the same method as Embodiments described above.

Next, a process of system selection is described with reference to FIG. 20A. The process starts at Step S2002 where a call is generated, i.e., a connection request is made. The request is received at Step S2004.

Next, the received signal at the mobile station 4 is measured (Step S2006). Then, the amount of Doppler shift at the mobile station 4 is measured (Step S2008). Then, the received signal at the base station 3 is measured (Step S2010). After the measurement of the received signal, it is determined whether the received signal strength of the base station satisfies the minimum quality, and the frequency band, which can be used, is selected (Step S2012). If neither of the signals of the frequency bands satisfies the minimum quality of the base station 3 (NO at Step S2012), the call is lost (Step S2014)

Otherwise, if the received signal strength of the base station 3 satisfies the minimum quality (YES at Step S2012), the received signal strength at the mobile station 4 is compared with a received signal strength threshold (Step S2016).

If the received signal strength S of the mobile station 4 satisfies $\{S<S1\}\cup\{S>S2\}$, i.e. S<S1, S>S2 at Step S2016, a system to be connected is determined by a threshold determination result based on the received signal strength (Step S2018). Further, if the received signal strength S of the mobile station 4 satisfies $\{S>S2\}$, i.e., S>S2 at Step S2018, the amount of Doppler shift at the mobile station 4 is compared with a Doppler shift threshold (Step S2020). Then, if Doppler shift $f_D$ is less than the amount of Doppler shift threshold $F_D$ (YES at Step S2020), the system $1_1$ is assigned (Step S2022). Otherwise, if the Doppler shift $f_D$ is greater than the Doppler shift threshold $F_D$ (NO at Step S2020), the system $1_2$ is assigned (Step S2026).

On the other hand, when the received signal strength S of the mobile station satisfies $\{S<S1\}$, i.e., S<S1 at Step S2018, a system using a low frequency band is selected (Step S2024) for communication between the base station and the mobile station. In this case, the system $1_2$ is selected (Step S2026).

If the received signal strength S of the mobile station satisfies $\{S1<S<S2\}$ at Step S2016, SIR is considered. Namely, a system that provides a higher SIR is selected for communication between the base station 3 and the mobile station 4 (Step S2028). Specifically, in the case of $SIR_1>SIR_2$, the system $1_1$ is selected (Step S2022), and in the case of $SIR_1<SIR_2$, the system $1_2$ is selected (Step S2026).

Next, a relation between the amount of Doppler shift and a ratio of allocation to a system using the low frequency band according to this Embodiment is described with reference to FIG. 20B. Here, since determination is performed by the amount of Doppler shift as for the mobile station 4, for received signal strength which exceeds $S_2$, the allocation ratio to the low frequency band increases corresponding to the amount $F_D$ of Doppler shift.

Figure 21:
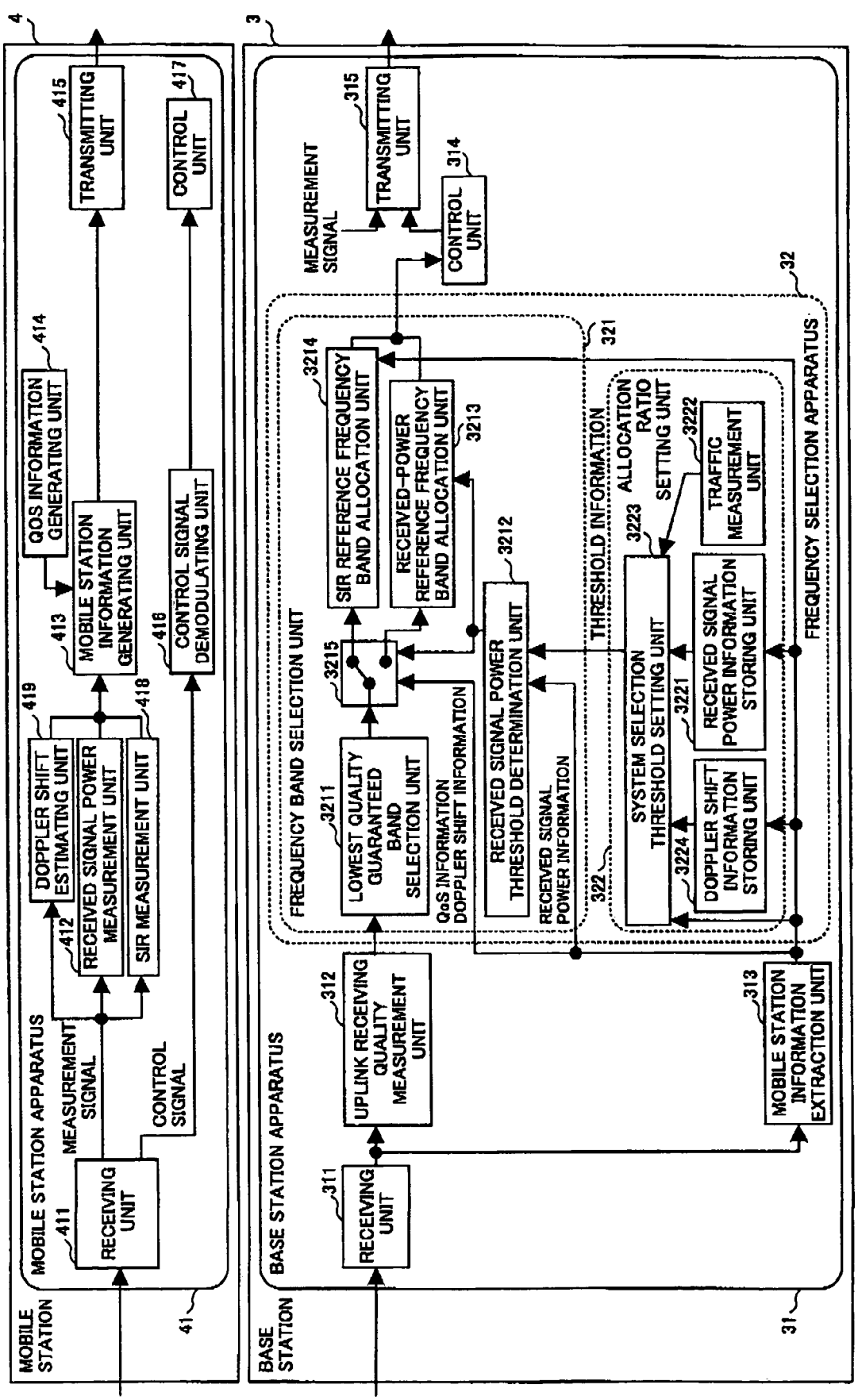
FIG. 21 is a block diagram showing the configuration of the mobile station and the base station according to the embodiment of the present invention.

Next, the mobile communications system according to Embodiment 7 of the present invention is described with reference to FIG. 21. The mobile communications system according to this Embodiment carries out threshold determination with reference to the received signal strength and the SIR value of the mobile station 4, and the threshold of received signal strength is set up according to the amount of Doppler shift of the mobile station 4 such that the frequency band is determined.

The mobile station 4 according to this Embodiment has the same structure as the mobile station described with reference to FIG. 19. The base station 3 includes a Doppler shift information storing unit 3224 connected to the system selection threshold setting unit 3223 and the mobile station information extraction unit 313 in addition to the base station described with reference to FIG. 16.

When assigning a channel for communication between the mobile station 4 and the base station 3, the mobile station 4 starts measurement of a received signal based on the received signal measurement request from the base station 3. The receiving unit 411 of the mobile station 4 receives signals transmitted from two or more base stations 3, and provides the signals to the received signal strength measurement unit 412, the SIR measurement unit 418, and the Doppler shift estimating unit 419 using the received signal measurement signal from a candidate base station 3.

Using the received signal measurement signal, the received signal strength measurement unit 412, the SIR measurement unit 418, and the Doppler shift estimating unit 419 extract a received signal strength measured value, SIR information, and a Doppler shift estimation value, and provide them to the mobile station information generating unit 413. Further, the QoS information generating unit 414 generates the QoS information about the mobile station 4 based on the communication quality that the mobile station 4 requires, and provide the QoS information to the mobile station information generating unit 413. The mobile station information generating unit 413 generates mobile station information using the received signal strength information of the mobile station 4, the SIR information, the Doppler shift information, and the QoS information, and provides the same to the transmitting unit 415. The transmitting unit 415 transmits the mobile station information to the base station 3 as the control signal.

The base station 3 determines the channel, its frequency band to be used, and the cellular system to connect for communication based on the mobile station information, and provides information to this effect to the mobile station 4 as the control signal.

The receiving unit 411 of the mobile station 4 extracts the control signal from the received signal that the candidate base station transmits, and provides the control signal to the control signal demodulating unit 416. The control signal demodulating unit 416 demodulates the control signal, extracts the information about the frequency band, a channel determined by the base station 3, and the cellular system to connect to, and provides a signal containing information to this effect to the control unit 417. Based on the signal, the control unit 417 sets up the frequency band and channel that are to be used for communication, and determines the cellular system to connect to.

On the other hand, the receiving unit 311 of the base station 3 receives the signal transmitted from the mobile station 4. The receiving unit 311 provides the received signal to the uplink received signal measurement unit 312 and the mobile station information extraction unit 313.

The uplink received signal measurement unit 312 performs measurement of the quality of the received signal of the signal, for example, received signal strength, and provides the measured value to the minimum quality guaranteed band selection unit 3211. The minimum quality guaranteed band selection unit 3211 measures received signal strength, selects the system that provides received signal strength required in order to establish communication, and outputs the minimum quality guarantee band information.

Further, the mobile station information extraction unit 313 extracts the mobile station information that contains the received signal strength information, the SIR information, the Doppler shift information, and the Qos information from the input signal, and provides the extracted mobile station information to the received signal strength information storing unit 3221, the received signal strength threshold determination unit 3212, and the SIR reference frequency band allocation unit 3214.

The received signal strength information storing unit 3221 stores the received signal strength information of all the mobile stations linked to the base station 3 concerned. When the mobile station information and a system selection threshold from the system selection threshold setting unit 3223 are provided to the received signal strength threshold determination unit 3212, the received signal strength threshold determination unit 3212 carries out threshold determination using the received signal strength information extracted from the mobile station information, and the above-mentioned system selection threshold such that a threshold determination result is obtained. In this case, the value output of the threshold determination of the Doppler shift information extracted from the mobile station information is used as the threshold used.

The switching unit 3215 selects one of the SIR reference frequency band allocation unit 3214 and the received power reference frequency band allocation unit 3213 based on the threshold determination result, the QoS information, and the minimum quality band guarantee information.

When the SIR reference frequency band allocation unit 3214 is selected, the SIR reference frequency band allocation unit 3214 selects a frequency band that provides the highest SIR value of the mobile station in each system, and provides the selection result of a frequency band to the control unit 314 as a frequency band selection result. On the other hand, when the received power reference frequency band allocation unit 3213 is selected, a frequency band is selected based on the above-mentioned threshold determination result, and the selection result is provided to the control unit 314 as the frequency band selection result.

The control unit 314 transmits the frequency band selection result to the mobile station 4 while starting communication control.

On the other hand, the threshold is updated as follows.

The mobile station information is provided to the received signal strength information storing unit 3221 of the allocation ratio setting unit 322. The received signal strength information storing unit 3221 records the received signal strength at the mobile station 4. The received signal strength information of the mobile station 4 linked to the base station 3 is provided to the system selection threshold setting unit 3223.

Further, the traffic measurement unit 3222 provides the system selection threshold setting unit 3223 with information about the amount of traffic that the base station accommodates. The system selection threshold setting unit 3223 obtains information about the resources (the number of channels) that are available at the base station 3.

Further, the mobile station information extraction unit 313 extracts the Doppler shift information of the mobile station linked to the base station 3 from the mobile station information, and provides the extracted Doppler shift information to the Doppler shift information storing unit 3224. The system selection threshold setting unit 3223 sets up the threshold of the received signal strength according to the value of the Doppler shift.

As described above, a threshold is also set up as for the Doppler shift, the threshold of the received signal strength is set up according to the threshold of the Doppler shift, and control is made such that the greater is the Doppler shift amount, the greater is the ratio of the low frequency; and the smaller is the Doppler shift amount, the greater is the ratio of the high frequency.

Figure 22A:
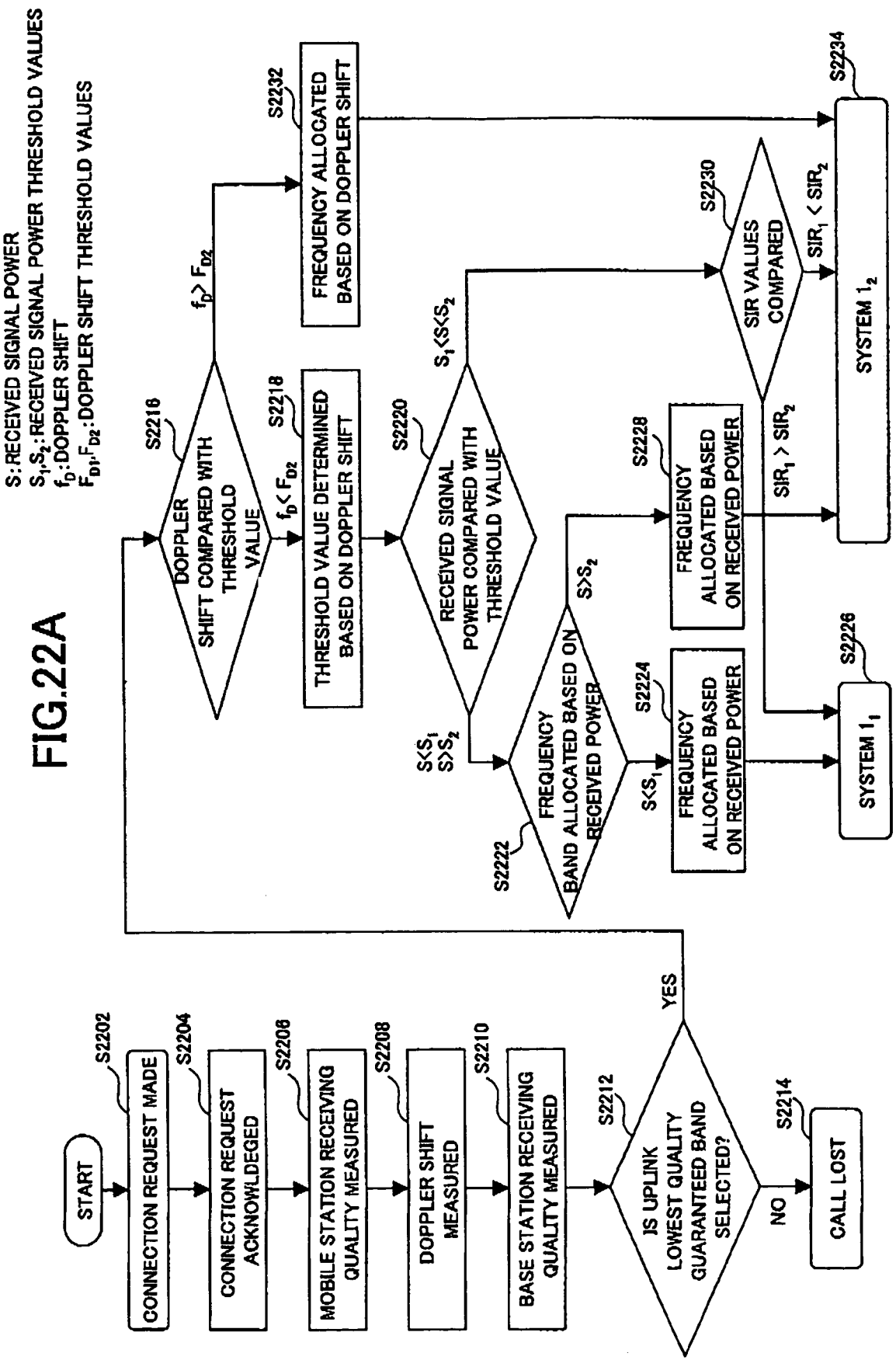
FIG. 22A is a flowchart showing the system selection flow according to the embodiment of the present invention.

Next, a process of system selection according to this Embodiment is described with reference to FIG. 22A. A connection request is made at Step S2202, which is received at Step S2204.

Then, measurement of the received signal of the mobile station 4 is performed at Step S2206. Next, the value of the Doppler shift at the mobile station concerned is measured at Step S2208. Then, the received signal of the base station 3 is measured at Step S2210.

After the received signal measurement, it is determined whether the received signal strength of the base station 3 satisfies the minimum quality, and a candidate available frequency band is selected at Step S2212. When neither of the signals of the frequency bands satisfies the minimum quality (NO at Step S2212), the call is lost (Step S2214).

On the other hand, when the received signal strength of the base station satisfies the minimum quality (YES at Step S2212), the amount $f_D$ of Doppler shift of the mobile station is compared with Doppler shift thresholds $F_{D1}$ and $F_{D2}$ ($F_{D1}<F_{D2}$) (Step S2216). If the amount $f_D$ of the Doppler shift of the mobile station 4 is greater than the Doppler shift threshold $F_{D2}$ ($f_D>F_{D2}$ at Step S2216), the low frequency band is selected for communication between the base station 3 and the mobile station 4, and connection is made to the system that uses the low frequency band (Step S2232). Consequently, the connection is made to the system $1_2$ (Step S2234).

On the other hand, if the amount $f_D$ of the Doppler shift of the mobile station satisfies $\{f_D<F_{D2}\}$, a threshold is set up based on the amount of Doppler shift (Step S2218). In this case, if the amount $f_D$ of the Doppler shift of the mobile station satisfies $\{F_{D1}<f_D<F_{D2}\}$, the received signal strength thresholds $S_1$ and $S_2$ ($S_1<S_2$) concerning the received signal strength S are set up as $S_1=S_{11}$ and $S_2=S_{12}$. Further, if the amount $f_D$ of the Doppler shift of the mobile station 4 satisfies $\{f_D<F_{D1}\}$, the received signal strength thresholds $S_1$ and $S_2$ ($S_1<S_2$) concerning the received signal strength S are set up as $S_1=S_{21}$ and $S_2=S_{22}$.

Next, the received signal strength S of the mobile station 4 is compared with the received signal strength thresholds (Step S2220). When the received signal strength S of the mobile station 4 satisfies $\{S<S_1\}\cup\{S>S2\}$, (i.e., $S<S_1$, $S>S_2$ at Step S2220), a system to be connected is determined by using the threshold determination result based on the received signal strength (Step S2222). In this case, when the received signal strength S of the mobile station satisfies $\{S<S_1\}$, (i.e., $S<S_1$ at Step S2222), connection is made to the system using the high frequency band for communication between the base station 3 and the mobile station 4 (Step S2224). Consequently, the connection is made to the system 11 (Step S2226). On the other hand, if the received signal strength S of the mobile station 4 satisfies $\{S>S_2\}$, (i.e., $S>S_2$ at Step S2222), connection is made to the system using the low frequency band for communication between the base station 3 and the mobile station 4 (Step S2228). Consequently, the connection is made to the system $1_2$ (Step S2234).

Further, if the received signal strength S of the mobile station 4 satisfies $\{S_1<S<S_2\}$, (i.e., $S_1<S<S_2$ at Step S2220), a system that provides the higher SIR is selected for communication between the base station 3 and the mobile station 4 (Step S2230). For example, if $SIR_1>SIR_2$ ($SIR_1>SIR_2$ at Step S2230), connection is made to the system $1_1$ (Step S2226), and if $SIR_1<SIR_2$ (i.e., $SIR_1<SIR_2$ at Step S2230), connection is made to the system $1_2$ (Step S2234).

Figure 22B:
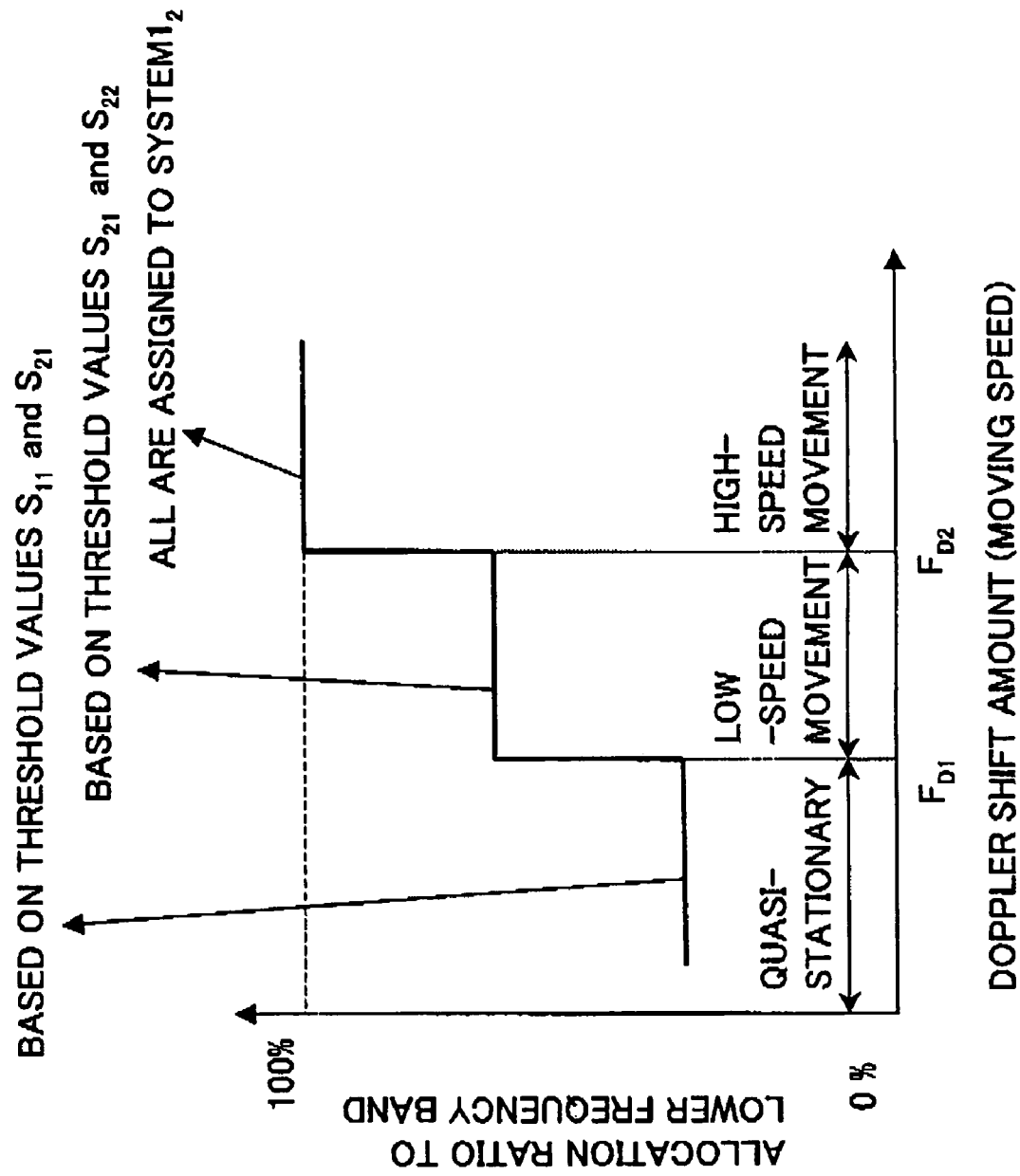
FIG. 22B is a graph showing the allocation ratio to the low frequency band system.

Next, a relation between the amount of Doppler shift and the allocation ratio to the low frequency band according to this Embodiment is shown in FIG. 22B. As the amount of Doppler shift becomes greater, the ratio of the lower frequency band being assigned is made greater such that stable communications are available. On the other hand, the high frequency band, capable of high-speed communication, is assigned to mobile stations, when the amount of Doppler shift is small.

Figure 23:
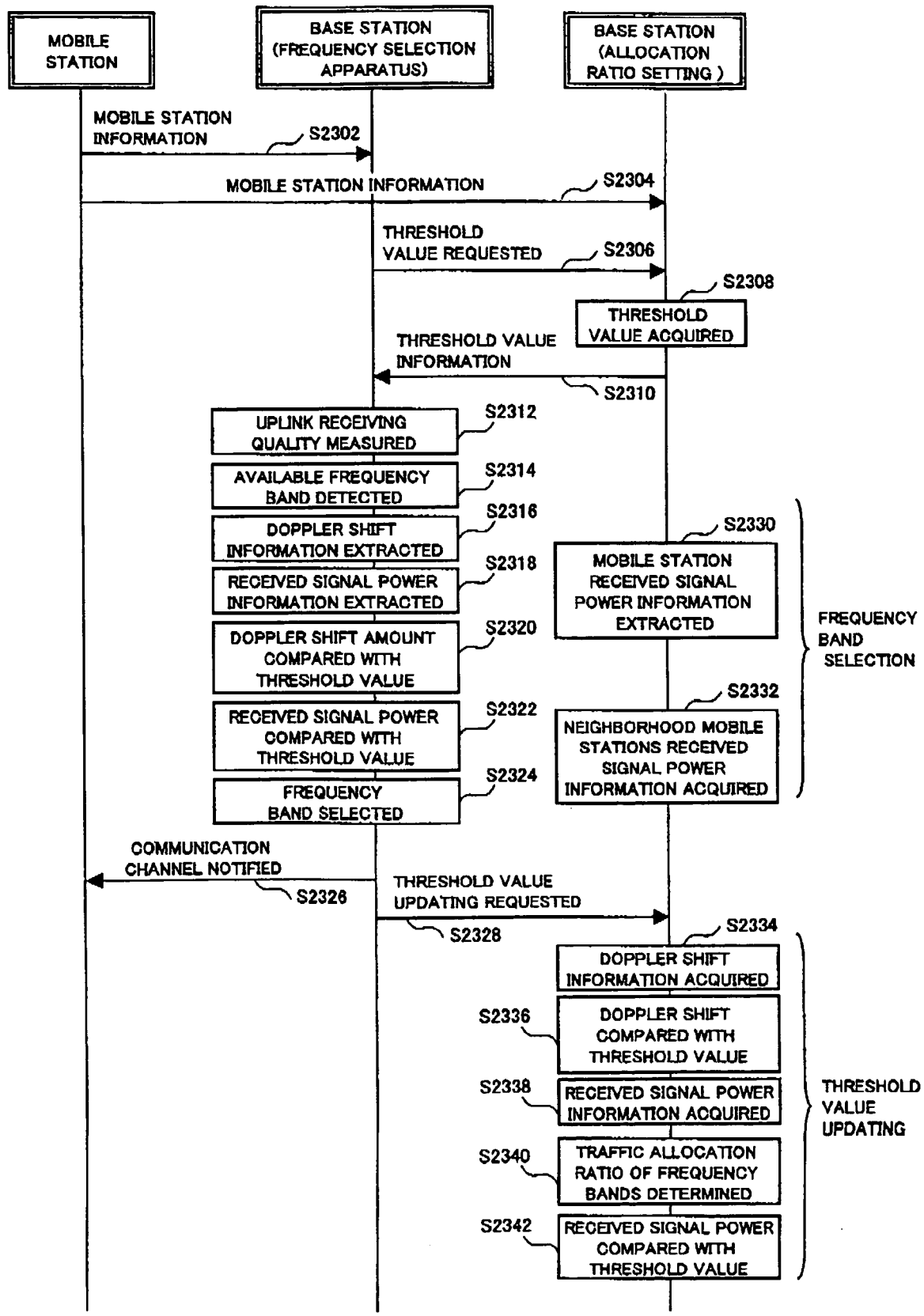
FIG. 23 is a flowchart showing the control flow of updating the threshold according to the embodiment of the present invention.

Next, an example of the control flows of the frequency band selection and threshold updating of the mobile communications system according to this Embodiment is shown in FIG. 23. The example is the case where a connection request is originated by the mobile station 4, the connection request and mobile station information being transmitted to the control unit 314 of the base station 3.

The mobile station information is provided to the frequency band selection unit 321 and the allocation ratio setting unit 322 from the control unit 314 at Step S2302 and Step S2304, respectively.

The frequency band selection unit 321 requests threshold information of the allocation ratio setting unit 322 (Step S2306), and the allocation ratio setting unit 322 acquires the threshold information (Step S2308) and transmits the threshold information to the frequency selection unit (Step S2310).

When the mobile station information is received, the frequency band selection unit 321 measures the received signal, for example, the received signal strength, of the uplink (Step S2312), and determines whether the received signal strength is sufficient for communication (Step S2314). Next, the frequency band selection unit 321 extracts the amount of Doppler shift at the mobile station, and received signal strength information from the mobile station information (Step S2316 and Step S2318, respectively). Next, the frequency band selection unit 321 performs the threshold determinations by the amount of Doppler shift and received signal strength (Step S2320 and Step S2322, respectively), and selects the frequency band for communication (Step S2324). After the frequency band is selected, the frequency band selection unit 321 provides the frequency band information through the control unit 314 to the mobile station (Step S2326). Consequently, communication is started.

Further, when the communication is started between the mobile station 4 and the base station 3, threshold updating is performed by the allocation ratio setting unit 322 of the base station 3.

The allocation ratio setting unit 322 extracts the received signal strength information of the mobile station (Step S2330), and acquires the received signal strength information of neighborhood mobile stations (Step S2332).

In the case of updating the threshold of the Doppler shift, the frequency band selection unit 321 sends a request for updating of the threshold to the allocation ratio setting unit 322. Then, the allocation ratio setting unit 322 acquires the Doppler shift information (Step S2334), and determines the threshold of the Doppler shift (Step S2336). When updating the threshold, the received signal strength information of the mobile station 4 is used, which is obtained by using the received signal strength of the base station 3 that is obtained from the mobile station information provided by the control unit, and by using information about received signal strength of the neighborhood mobile stations acquired from the received signal strength information storing unit 3221 (Step S2338).

On the other hand, the traffic measurement unit 3222 measures the traffic information of each frequency band at the base station, and obtains the number of available channels in each frequency band. Next, a ratio of the traffic to be assigned to two frequency bands, is set up based on the number of available channels of each band (Step S2340). Further, the distribution of received signal strength can be obtained from the received signal strength information. Then, the received signal strength threshold is determined (Step S2342).

The threshold of the received signal strength is set up in the same way as Embodiments described above. When the threshold is set up, the allocation ratio setting unit 322 updates the Doppler shift information and the received signal strength information.

Figure 24:
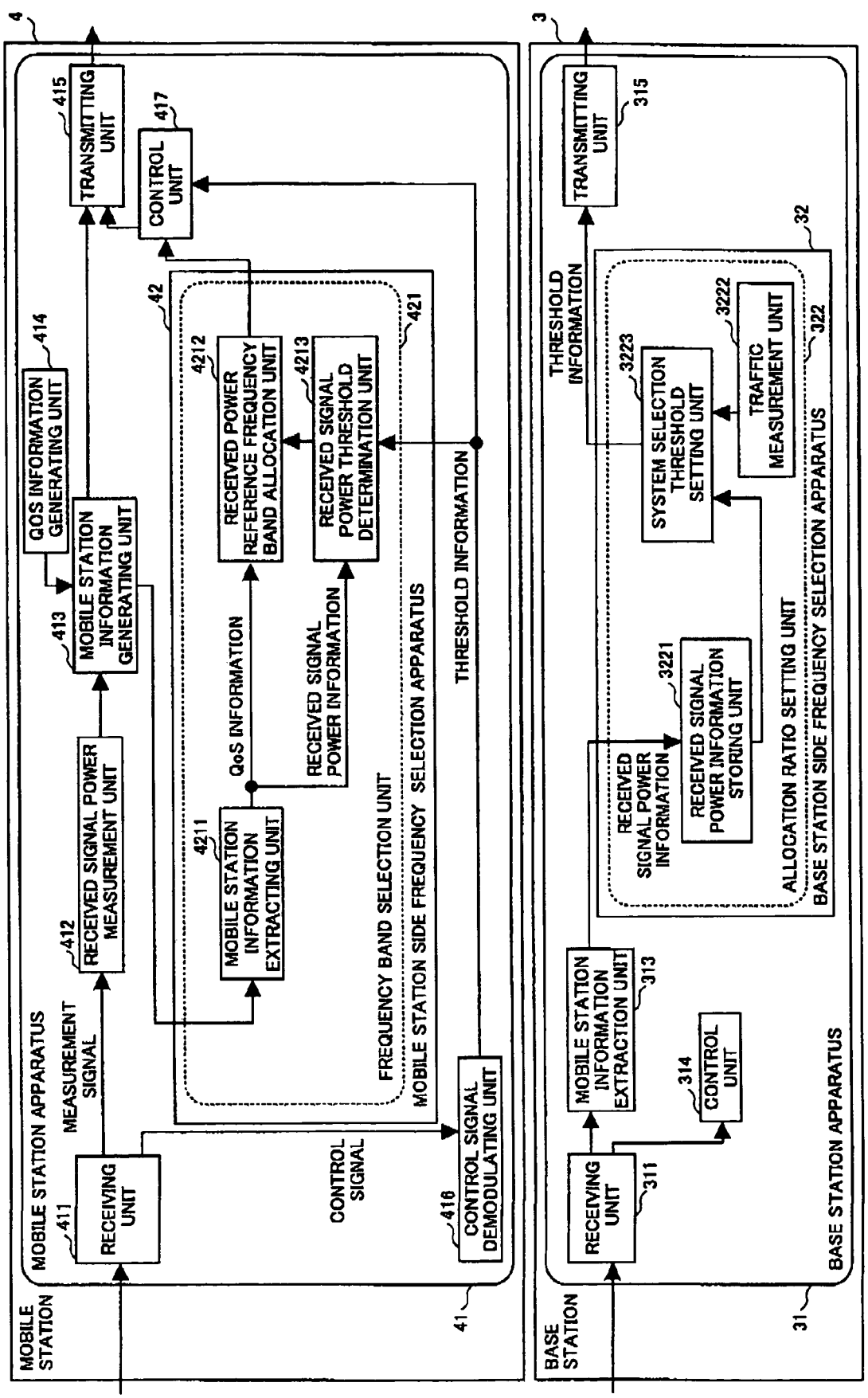
FIG. 24 is a block diagram showing the configuration of the mobile station and the base station according to the embodiment of the present invention.

Next, the mobile communications system according to Embodiment 8 of the present invention is described with reference to FIG. 24.

As for the mobile communications system according to this Embodiment, the mobile station 4 includes a frequency selection apparatus, and when assigning a channel for communication between the mobile station 4 and the base station 3, the mobile station 4 starts measurement of a received signal based on the received signal measurement request from the base station 3.

The mobile station 4 according to this Embodiment includes a mobile station side frequency selection apparatus 42 in addition to the mobile station described with reference to FIG. 13, which is connected to the mobile station information generating unit 413, the control unit 417, and the control signal demodulating unit 416. The mobile station side frequency selection apparatus 42 includes a frequency band selection unit 421. The frequency band selection unit 421 includes a mobile station information extraction unit 4211 connected to the mobile station information generating unit 413, the received power reference frequency band allocation unit 4212 connected to the mobile station information extraction unit 4211 and the control unit 417, and the received signal strength threshold determination unit 4213 connected to the mobile station information extraction unit 4211, the received power reference frequency band allocation unit 4212, and the control signal demodulating unit 416.

Further, the base station 3 according to this Embodiment includes the base station apparatus 31. The base station apparatus 31 includes the transmitting unit 315 connected to the base station side frequency selection apparatus 32 connected to the mobile station information extraction unit 313, the mobile station information extraction unit 313 and the control unit 314 which are connected to the receiving-unit 311, the receiving unit 311, and the base station side frequency selection apparatus 32. The base station side frequency selection apparatus 32 includes the allocation ratio setting unit 322. The allocation ratio setting unit 322 includes a received signal strength information storing unit 3221 connected to the mobile station information extraction unit 313, a system selection threshold setting unit 3223 connected to the received signal strength information storing unit 3221 and the transmitting unit 315, and a traffic measurement unit 3222 connected to the system selection threshold setting unit 3223.

The receiving unit 411 of the mobile station 4 receives the signal transmitted from two or more base stations, and extracts the signal for the received signal measurement from a candidate base station. The receiving unit 411 provides the received signal to the received signal strength measurement unit 412 and the control signal demodulating unit 416.

The received signal strength measurement unit 412 measures the received signal strength (the strength of the signal received) from the base station 3 using the received signal measurement signal, and provides information about the received signal strength to the mobile station information generating unit 413. The mobile station information generating unit 413 generates the information about the received signal strength of the mobile station 4, and the QoS information provided by the QoS information generating unit 414 as mobile station information. Further, the mobile station information generating unit 413 provides the generated mobile station information to the frequency band selection unit 421 and the transmitting unit 415.

On the other hand, the control signal demodulating unit 416 demodulates the provided signal as a control signal. The control signal contains the threshold information set up by the base station 3, and the control signal demodulating unit 416 provides the extracted threshold information to the frequency band selection unit 421. That is, the mobile station information and the threshold information are provided to the mobile station side frequency band selection apparatus 42.

The mobile station information is provided to the mobile station information extraction unit 4211 of the mobile station side frequency band selection apparatus 42. The mobile station information extraction unit 4211 provides the received signal strength information to the received signal strength threshold determination unit 4213. Further, the threshold information is provided to the received signal strength threshold determination unit 4213.

The received signal strength threshold determination unit 4213 performs a threshold determination based on the value of the received signal strength information, and the threshold value information, that is, compares the received signal strength value with the threshold value, and provides a result of the threshold determination to the received power reference frequency band selection unit 4212. The received power reference frequency band allocation unit 4212 selects a frequency band that satisfies the threshold determination result out of frequency bands that satisfy the QoS information requirement based on the threshold determination result and the QoS information provided by the mobile station information extraction unit 4211, and provides the selection result to the control unit 417.

The control unit 417 provides the transmitting unit 415 with control information that includes the channel to be used for communication, its frequency band, and the information about the cellular system to connect to, which are determined based on the frequency band selection result, and the mobile station information provided by the mobile station information generating unit 413. The transmitting unit 415 transmits the provided control information to the base station 3.

On the other hand, the receiving unit 311 of the base station 3 receives the signal transmitted from the mobile station 4. The receiving unit 311 provides the received signal to the mobile station information extraction unit 313. The mobile station information extraction unit 313 extracts mobile station information including received signal strength information and QoS information from the signal generated by the mobile station 4. Threshold updating using the mobile station information is performed as follows.

The mobile station information is provided to the received signal strength information storing unit 3221 of the allocation ratio setting unit 322, and the received signal strength at the mobile station is recorded. The received signal strength information at the mobile station linked to the base station is provided to the system selection threshold setting unit 3223. Further, the traffic measurement unit 3222 provides the system selection threshold setting unit 3223 with the amount of traffic accommodated by the base station. The system selection threshold setting unit 3223 obtains information about available resources (the number of available channels) of the base station based on the provided amount of traffic. Further, the system selection threshold setting unit 3223 determines the system selection threshold of the mobile station 4 based on the information about the available resources, and the received signal strength in each mobile station. The determined threshold information is transmitted to each mobile station from the transmitting unit 315. The threshold is determined according to the same method as the Embodiments described above.

Figure 25:
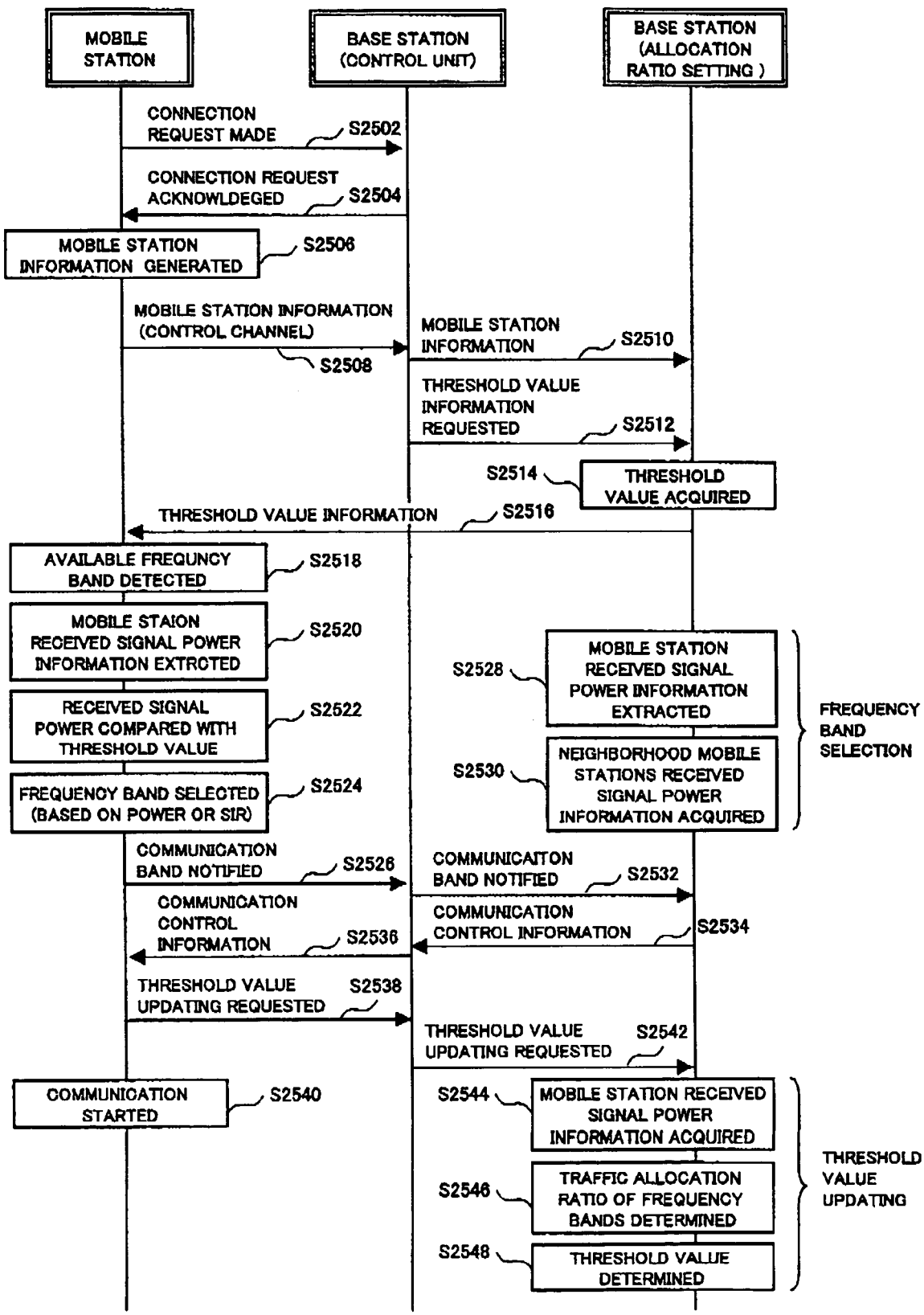
FIG. 25 is flowchart showing the control flow of the frequency selection and the threshold updating according to the embodiment of the present invention.

Next, an example of control flows of the frequency band selection and threshold updating according to this Embodiment is described with reference to FIG. 25. Here, the example is the case wherein a connection request is made by the mobile station 4. In the case of the connection request, the mobile station 4 performs a connection request to the control unit of the base station 3 (Step S2502). The base station 3 receives the connection request, and transmits a connection request acknowledgement signal (Step S2504). Then, the mobile station 4 measures the signal from the base station 3, and generates mobile station information (Step S2506).

The mobile station information is provided to the frequency band selection apparatus 42 of the mobile station 4, and is transmitted to the control unit 314 of the base station 3, and the allocation ratio setting unit 322 (Step S2508 and Step S2510, respectively).

The control unit of the base station 3 requests threshold information of the allocation ratio setting unit 322 (Step S2512). The allocation ratio setting unit 322 acquires the threshold information (Step S2514), and transmits the same to the mobile station 4 (Step S2516).

When the mobile station information is provided, the mobile station side frequency band selection apparatus 42 detects an available frequency band (Step S2518), extracts the received signal strength value at the mobile station 4 (Step S2520), performs the threshold determination of the received signal strength information of the mobile station 4 (Step S2522), and selects a frequency band based on the mobile station information (Step S2524). If a frequency band is selected, the frequency band information is provided to the base station 3 through the control unit 417 (Step S2526 and Step S2532), communication control information, such as a communication channel, is transmitted from the base station 3 to the mobile station 4 (Step S2534 and Step S2536), and communication is started (Step S2540).

On the other hand, the allocation ratio setting unit 322 extracts the received signal strength information of the mobile station (Step S2528). Then, the received signal strength information of neighborhood mobile stations is obtained (Step S2530).

Further, when the communication is started, threshold updating is carried out. At that instance, a threshold update request is provided to the control station and the allocation ratio setting unit 322 from the mobile station 4 (Step S2538 and Step S2542). Next, the received signal strength information about all the mobile stations linked to the base station concerned is acquired by using the received signal strength at the mobile station acquired from the mobile station information provided by the control unit, and neighborhood mobile station received signal strength information acquired from the received signal strength information storing unit 3221 (Step S2544). Further, the traffic measurement unit 3222 acquires the number of available channels in each frequency band by measuring the traffic information about each frequency band at the base station. The ratio of the traffic to be assigned to the two frequency bands is set up based on the number of available channels in each band (Step S2546). Further, the distribution of the received signal strength can be obtained from the received signal strength information. Next, the threshold value is determined (Step S2548), The setting method of the threshold value is the same as the Embodiments described above. The determined threshold value is provided to the mobile station side frequency band selection apparatus 42 of the mobile station 4, and threshold updating is performed.

Figure 26:
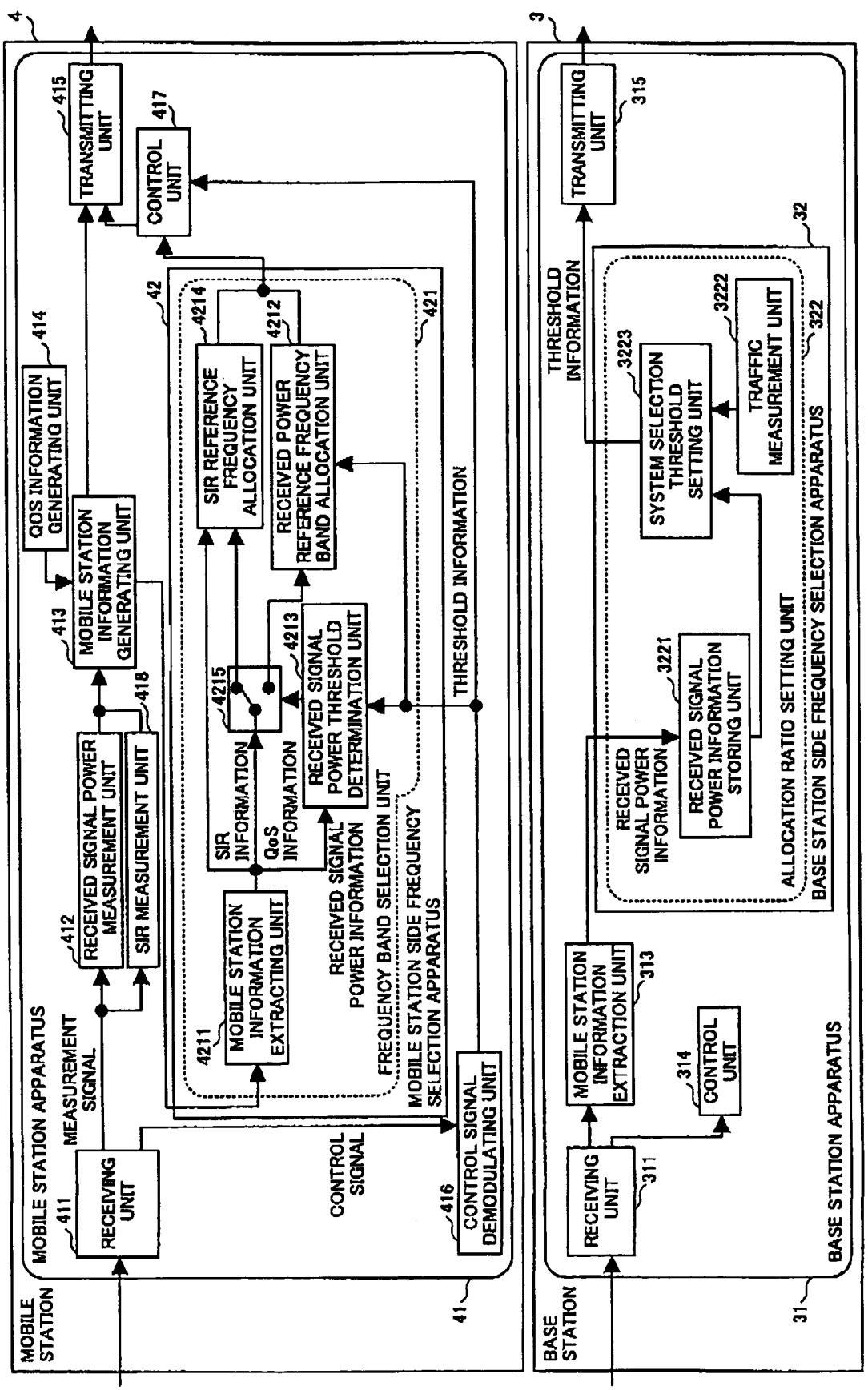
FIG. 26 is a block diagram showing the configuration of the mobile station and the base station according to the embodiment of the present invention.

Next, the mobile communications system according to Embodiment 9 of the present invention is described with reference to FIG. 26.

The mobile station 4 according to this Embodiment, in addition to the mobile station described with reference to FIG. 24, includes an SIR measurement unit 418 connected to the receiving unit 411 and the mobile station information generating unit 413, an SIR reference frequency band allocation unit 4214 connected to the mobile station information extraction unit 4211 and the control unit 417, and a switching unit 4215 that switches between the SIR reference frequency band allocation unit 4214 and the received power reference frequency band allocation unit 4212 to be connected to the mobile station information extraction unit 4211. Further, the received signal strength threshold determination unit 4213 is connected to the switching unit 4215. The base station is the same as the base station described with reference to FIG. 24.

The mobile communications system according to this Embodiment starts measurement of a received signal at the mobile station 4 based on the received signal measurement request from the base station 3. The received signal is provided to the received signal strength measurement unit 412, the SIR measurement unit 41B, and the control signal demodulating unit 416. Output results of the received signal strength measurement unit 412 and the SIR measurement unit 418 are provided to the mobile station information generating unit 413. The mobile station information generating unit 413 generates the mobile station information using the received signal strength information at the mobile station 4, the receiving SIR information, and the QoS information provided by the QoS information generating unit 414. The generated mobile station information is provided to the mobile station information extraction unit 4211 of the mobile station side frequency band selection apparatus 42.

On the other hand, the signal provided to the control signal demodulating unit 416 is demodulated, and the control signal is obtained. The control signal includes the threshold information set up by the base station 3, and the threshold information is provided to the received signal strength threshold determination unit 4213 of the frequency band selection apparatus 42, and the received power reference frequency band allocation unit 4212.

Further, the mobile station information provided to the mobile station information extraction unit 4211 is output as the received signal strength information, the SIR information, and the QoS information. The received signal strength information is provided to the received signal strength threshold determination unit 4213 like the threshold information. The received signal strength threshold determination unit 4213 performs threshold determination of the received signal strength using the threshold value information, that is, the received signal strength value is compared with the threshold value. The switching unit 4215 selects the system of a frequency band that satisfies the QoS requested by the mobile station based on the QoS information. Here, one of the SIR reference frequency band allocation unit 4214 and the received power reference frequency band allocation units 4212 is selected based on a threshold determination result.

The threshold determination result and the control information are provided to the control unit 417. The control unit 417 adds the determination result to the control information, and provides the same to the transmitting unit 415 with mobile station information. The transmitting unit 415 transmits the provided signal to the base station 3.

Figure 27:
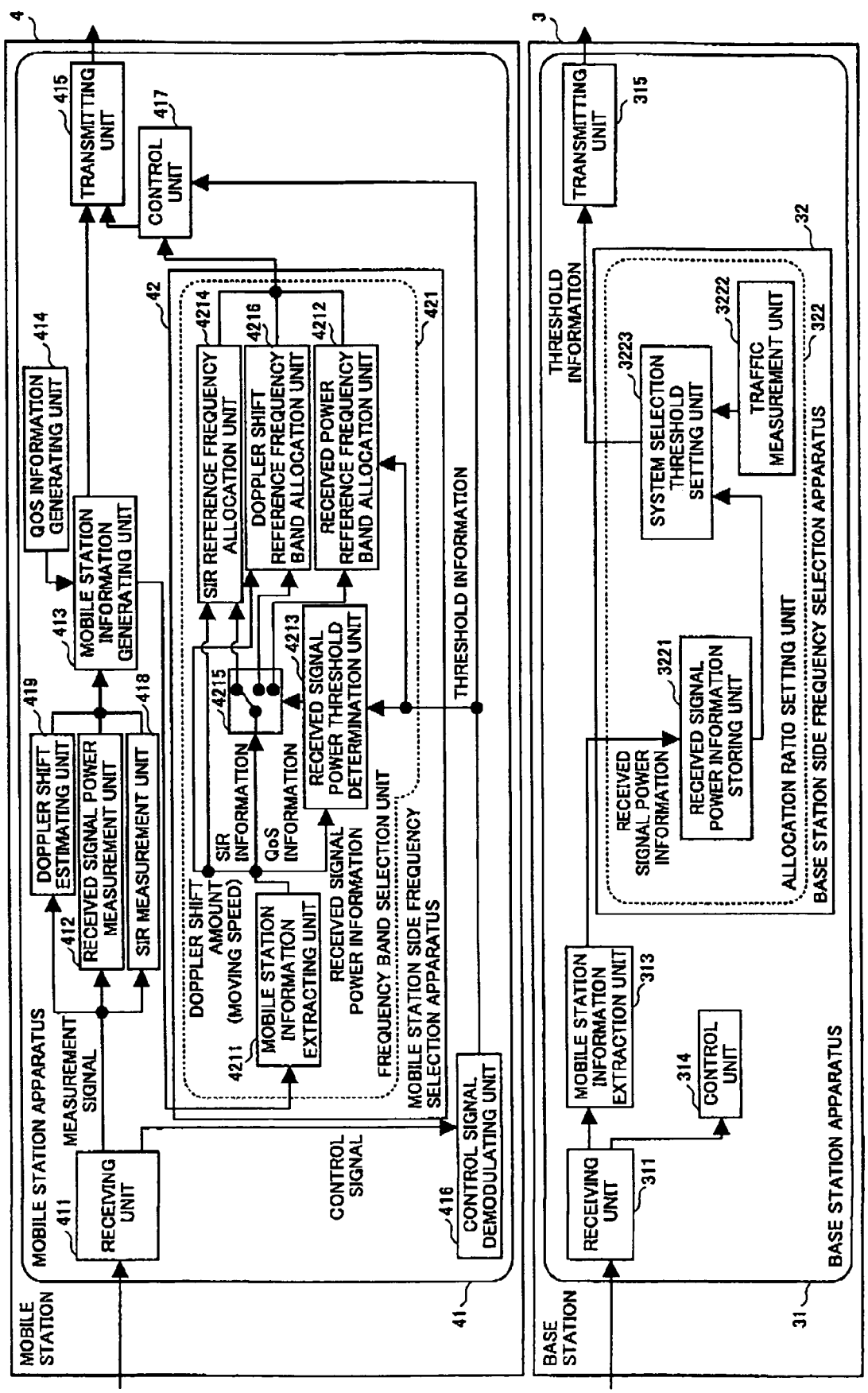
FIG. 27 is a block diagram showing the configuration of the mobile station and the base station according to the embodiment of the present invention.

Next, the mobile communications system according to Embodiment 10 of the present invention is described with reference to FIG. 27.

The mobile station 4 according to this Embodiment includes, in addition to the mobile station described with reference to FIG. 26, a Doppler shift estimating unit 419 connected to the receiving unit 411 and the mobile station information generating unit 413, a mobile station information extraction unit 4211, and a Doppler shift reference frequency band allocation unit 4216 connected to the control unit 417. The switching unit 4215 switches the mobile station information extraction unit 4211 to be connected to one of the SIR reference frequency allocation unit 4214, the received power reference frequency band allocation unit 4212, and the Doppler shift reference frequency band allocation unit 4216. The base station of the present Embodiment is the same as the base station described with reference to FIG. 24.

In the mobile communications system according to this Embodiment, the mobile station 4 starts measurement of a received signal based on the received signal measurement request from the base station 3. The receiving unit 411 provides the received signal to the received signal strength measurement unit 412, the SIR measurement unit 418, the Doppler shift measurement unit 419, and the control signal demodulating unit 416. Outputs of the received signal strength measurement unit 412, the SIR measurement unit 418, and the Doppler shift measurement unit 419 are provided to the mobile station information generating unit 413. The mobile station information generating unit 413 generates mobile station information using the received signal strength information at the mobile station 4, the receiving SIR information, the Doppler shift information, and the QoS information. Further, the mobile station information generating unit 413 provides the generated mobile station information to the mobile station information extraction unit 4211 of the frequency band selection apparatus 42 of the mobile station 4.

On the other hand, the control signal demodulating unit 416 demodulates the provided signal, and a control signal is obtained. The threshold information set up by the base station 3 is included in the control information. The control signal demodulating unit 416 provides the threshold information to the received signal strength threshold determination unit 4213 and the received power reference frequency band allocation unit 4212 of the frequency band selection apparatus 42.

Further, the mobile station information extraction unit 4211 provides the mobile station information to the received signal strength threshold determination unit 4213, the SIR reference frequency band allocation unit 4214, the Doppler shift reference frequency band allocation unit 4216, and the switching unit 4215 as the received signal strength information, the SIR information, the Doppler shift information, and the QoS information, respectively. The received signal strength threshold determination unit 4213 performs threshold determination of the received signal strength using the threshold information, i.e., the received signal strength value is compared with the threshold value.

The switching unit 4215 selects the system of a frequency band that satisfies the QoS requested by the mobile station 4 using the QoS information. In this case, one of the Doppler shift reference frequency band allocation unit 4216, the SIR reference frequency band allocation unit 4214, and the received power reference frequency band allocation units 4212 is selected based on a result of the threshold determination. The threshold determination result and the control information are provided to the control unit 417. The control unit 417 adds the determination result to the control information, and provides the same to the transmitting unit 415 with the mobile station information. The transmitting unit 415 transmits the provided signal to the base station 3.

Figure 28:
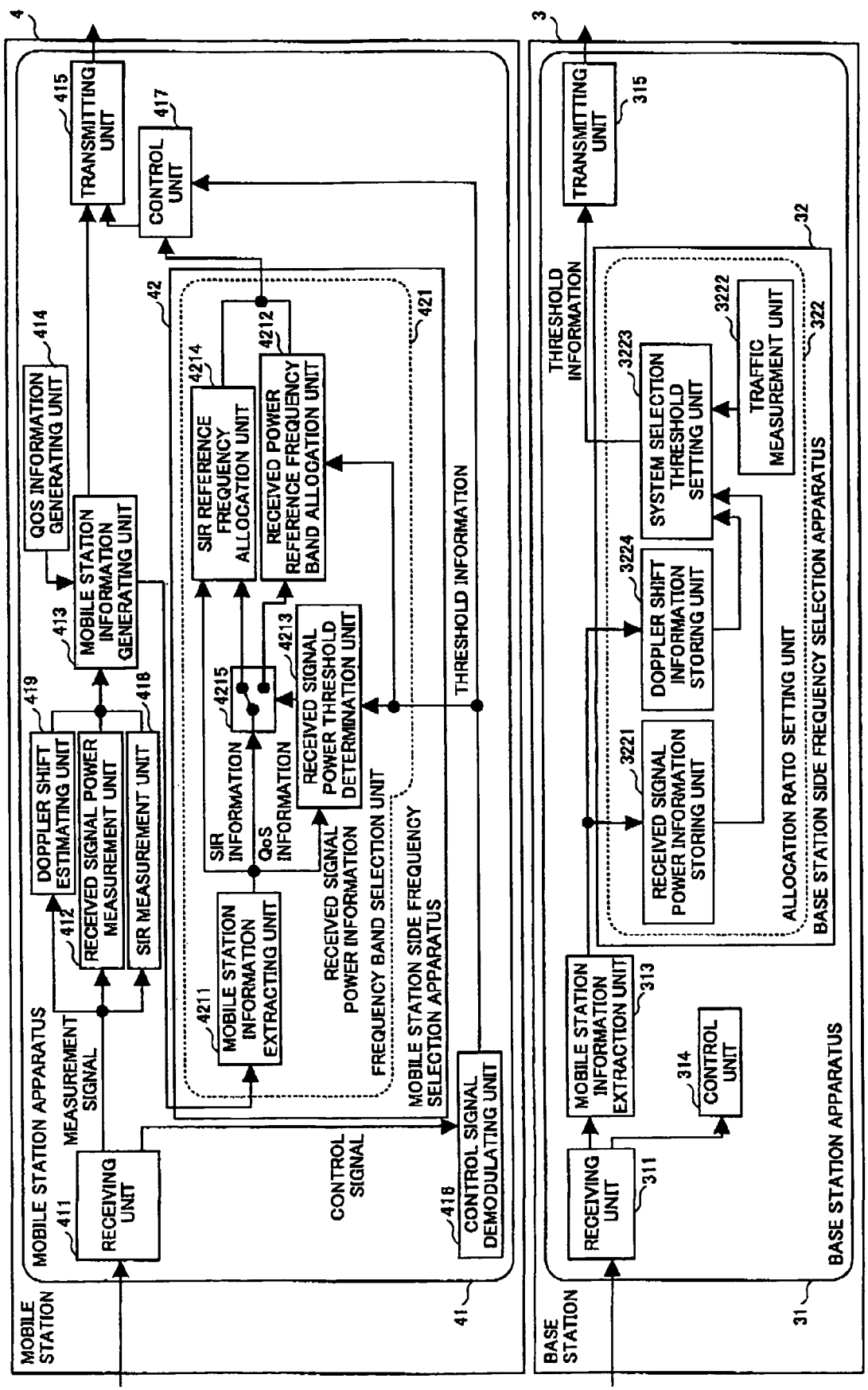
FIG. 28 is a block diagram showing the configuration of the mobile station and the base station according to the embodiment of the present invention.

Next, the mobile communications system according to Embodiment 11 of the present invention is described with reference to FIG. 28.

The mobile station 4 according to this Embodiment includes a Doppler shift estimating unit 419 connected to the receiving unit 411 and the mobile station information generating unit 413, in addition to the mobile station described with reference to FIG. 26. Further, the base station 3 includes, in addition to the base station described with reference to FIG. 26, a Doppler shift information storing unit 3224 connected to the mobile station information extraction unit 313 and the system selection threshold setting unit 3223.

In the mobile communications system according to this Embodiment, the mobile station 4 starts measurement of a received signal based on the received signal measurement request from the base station 3. The receiving unit 411 provides the received signal to the received signal strength measurement unit 412, the SIR measurement unit 418, the Doppler shift estimating unit 419, and the control signal demodulating unit 416. The received signal strength measurement unit 412, the SIR measurement unit 418, and the Doppler shift estimating unit 419 provide their respective outputs to the mobile station information generating unit 413. The mobile station information generating unit 413 generates the mobile station information using the received signal strength information at the mobile station 4, the receiving SIR information, and the QoS information. The mobile station information generating unit 413 provides the generated mobile station information to the mobile station information extraction unit 4211 of the mobile station side frequency band selection apparatus 42 of the mobile station 4.

On the other hand, the control signal demodulating unit 416 demodulates the provided received signal, and the control signal is obtained. The control signal contains the threshold information set up by the base station 3. The control signal demodulating unit 416 provides the threshold information to the received signal strength threshold determination unit 4213 and the received signal strength reference frequency band allocation unit 4212 of the frequency band selection apparatus 42. Further, the mobile station information extraction unit 4211 provides the mobile station information to the received signal strength threshold determination unit 4213, the SIR reference frequency band allocation unit 4214, and the switching unit 4215 as the received signal strength information, the SIR information, and the QoS information. The received signal strength threshold determination unit 4213 performs threshold determination of the received signal strength using the threshold information, i.e., the received signal strength value is compared with the threshold value.

Further, the switching unit 4215 selects the system of a frequency band that satisfies the QoS requested by the mobile station based on the QoS information, and selects one of the SIR reference frequency band allocation unit 4214 and the received power reference frequency band allocation units 4212 using a result of the threshold determination. The determination result and the control information are provided to the control unit 417. The control unit 417 adds the determination result to the control information, and transmits the same to the base station 3 through the transmitting unit 415 with the mobile station information.

On the other hand, the receiving unit 311 of the base station receives a signal, and provides the received signal to the mobile station information extraction unit 313. The mobile station information extraction unit 313 extracts the mobile station information including the received signal strength information and the QoS information from the received signal. Further, the base station side frequency selection apparatus 32 performs threshold updating using the mobile station information. The mobile station information extraction unit 313 provides the mobile station information to the received signal strength information storing unit 3221, and the Doppler shift information storing unit 3224 of the allocation ratio setting unit 322. The received signal strength information storing unit 3221 and the Doppler shift information storing unit 3224 record the received signal strength and the Doppler shift information, respectively, of the mobile station, and provide the received signal strength information and the Doppler shift information of mobile stations linked to the base station to the system selection threshold setting unit 3223.

Further, the traffic measurement unit 3222 measures the amount of traffic accommodated by the base station, and provides a measurement result to the system selection threshold setting unit 3223. The system selection threshold setting unit 3223 obtains the available resources (the number of available channels) of the base station. Further, the system selection threshold setting unit 3223 determines the system selection threshold provided to the received signal strength threshold determination unit 4213 in a mobile station. The determined threshold information is transmitted to each mobile station from the transmitting unit 315. The determination method of a threshold is the same as that of the Embodiment described above.

Figure 29:
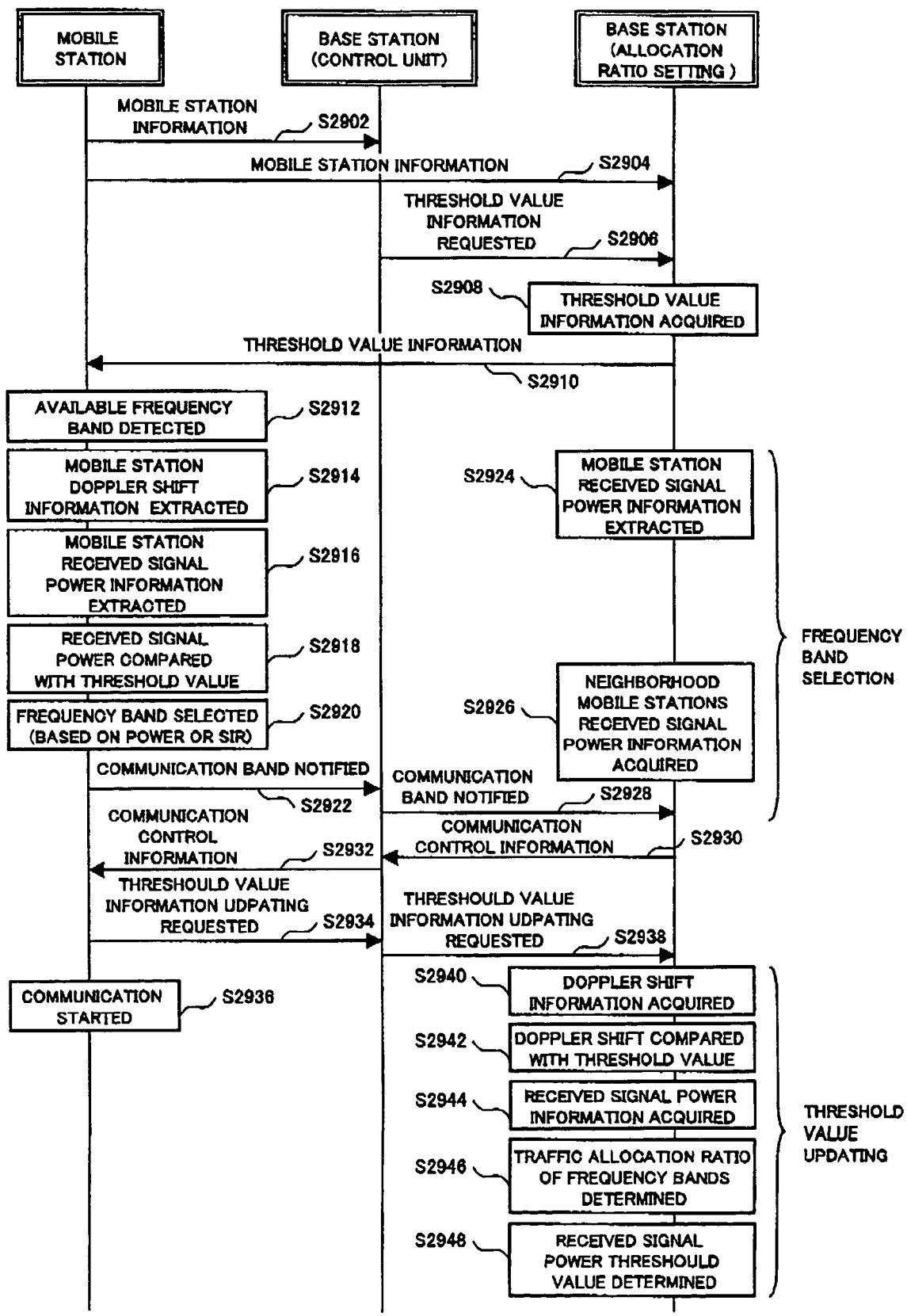
FIG. 29 is a flowchart showing the control flow of the frequency band selection and the threshold updating according to the embodiment of the present invention.

Next, an example of the control flows of the frequency band selection and threshold updating according to this Embodiment is described with reference to FIG. 29.

Here, the flow starts with the mobile station 4 transmitting a connection request. Then, the base station 3 receives the connection request, and transmits a connection request acknowledgement signal. Subsequent events are shown in FIG. 29.

The mobile station 4 measures the received signal from the base station, and generates the mobile station information. The mobile station information is provided to the frequency band selection apparatus 42 of the mobile station 4 (Step S2902), and is provided to the allocation ratio setting unit 322 (Step S2904). When the mobile station information is provided, the frequency band selection apparatus 42 requests threshold information of the allocation ratio setting unit 322 (Step S2906). The allocation ratio setting unit 322 acquires the threshold information (Step S2908), and provides the threshold information to the mobile station 4 (Step S2910).

On the other hand, the mobile station 4 detects a frequency band that is available (Step S2912). Then, the mobile station 4 extracts the Doppler shift information and the received signal strength value at the mobile station 4 (Step S2914 and Step S2916, respectively), sets up the received signal strength threshold according to the Doppler shift, performs a threshold determination of the received signal strength information (Step S2918), and selects a frequency band (Step S2920).

When a frequency band is selected, the frequency band information selected is provided to the base station 3 through the control unit 417 (Step S2922 and Step S2928), communication control information, such as a communication channel, is provided to the mobile station 4 from the base station 3 (Step S2930 and Step S2932), and communication is started (Step S2936).

On the other hand, the allocation ratio setting unit 322 extracts the received signal strength information of the mobile station (Step S2924). Further, the allocation ratio setting unit 322 acquires the received signal strength information of neighborhood mobile stations (Step S2926).

Further, when the communication is started between the mobile station 4 and the base station 3, threshold updating is performed by the allocation ratio setting unit 322 of the base station 3. The mobile station 4 provides a request for updated threshold value information to the base station 3 (Step S2934 and Step S2938). In the case of updating the threshold value of the Doppler shift, the threshold is updated (Step S2942) using the Doppler information of the neighborhood mobile stations and the Doppler shift information of the mobile station concerned that are acquired (Step S2940).

Further, in the case of updating the threshold of the received signal strength, the received signal strength information about all the mobile stations linked to the base station concerned is used, which is obtained based on the received signal strength of the mobile station concerned acquired from the mobile station information provided by the control unit, and the neighborhood mobile station received signal strength information acquired from the received signal strength information storing unit 3221 (Step S2944). On the other hand, the traffic measurement unit 3222 measures the traffic information about each frequency band at the base station concerned, and obtains the number of available channels in each frequency band. Further, the ratio of the traffic to be assigned to two frequency bands is determined based on the number of available channels in each band (Step S2946).

The distribution of received signal strength can be obtained from the received signal strength information output from the received signal strength information storing unit 3221. Then, the threshold of the received signal strength is determined (Step S2948). The threshold is determined by first obtaining the ratio (first ratio) of an available frequency bandwidth of each system. Then, a ratio (second ratio) of the bandwidth assigned to mobile stations having the received signal strength exceeding the threshold when the threshold determination is carried out in each mobile station, and the bandwidth assigned to mobile stations having the received signal strength below the threshold is obtained. Then, the threshold is set up such that the second ratio becomes equal to the first ratio. The threshold determined in this way is provided to the frequency band selection apparatus 42 of the mobile station 4, and threshold updating is performed.

According to Embodiments of the present invention, the radio system employs the multi-band control such that effective use of the frequency resources, obtaining the service area, and improvement in the throughput property are realized by performing system selection and resource control in consideration of the difference in the propagation property due to the frequency bands.

Embodiments are described as being constituted by two cellular systems using the same communication system; nevertheless, the present invention also provides effective use of the frequency resources, obtaining the service area, and improvement in the throughput property in the case that three or more cellular systems coexist.

APPLICABILITY TO THE INDUSTRY

The frequency selection apparatus, the mobile communications system, and the multi-band resource management method according to the present invention are applicable to two or more mobile communications systems served by two or more frequency bands.

Further, the present invention is not limited to these embodiments, but variations and modifications may be made without departing from the scope of the present invention.

The present application is based on Japanese Priority Application No. 2004-160142 filed on May 28, 2004 with the Japanese Patent Office, the entire contents of which are hereby incorporated by reference.

What is claimed is:

1. A radio frequency selection apparatus in a plurality of cellular systems using a plurality of frequency bands wherein the cellular systems include a higher frequency band system and a lower frequency band system, comprising:

- an information acquisition unit configured to acquire environmental information about a mobile station for each of one or more of the frequency bands available to the mobile station; and
- a frequency band determining unit configured to determine based on the environmental information and mobile station information provided by the mobile station which of one or more of the frequency bands is to be used and which of the systems is to be connected to the mobile station, wherein
- the environmental information comprising a radio-wave-propagation property of the mobile station, and
- the frequency band determining unit is configured to determine that the higher frequency band system is to be used if the mobile station resides in a better radio-wave-propagation area and the lower frequency band system is to be used if the mobile station resides in a worse radio-wave-propagation area.

2. The radio frequency selection apparatus as claimed in claim 1, further comprising:

- a system selection unit for selecting the system that satisfies quality of received signal of the mobile station based on received signal of an uplink; and
- a frequency band allocation unit for assigning the frequency band based on the selection result by the system selection unit, and the information provided by the mobile station.

3. The radio frequency selection apparatus as claimed in claim 2, further comprising:

- a determination unit for comparing a value contained in the environmental information with a corresponding threshold value;
- wherein the frequency band allocation unit assigns the frequency band based on a result of the determination unit.

4. The radio frequency selection apparatus as claimed claim 1, further comprising:

- an allocation ratio setting unit for setting up a ratio of traffic to be assigned to each of the frequency bands based on the environmental information.

5. The radio frequency selection apparatus as claimed in claim 2, wherein the frequency band allocation unit assigns the frequency band based on at least one of SIR criterion, received power criterion, and Doppler shift criterion according to the result of the determination unit.

6. The radio frequency selection apparatus as claimed in claim 2, wherein the frequency band allocation unit assigns the frequency band based on received power and traffic information.

7. The radio frequency selection apparatus as claimed in claim 1, wherein the information acquisition unit includes at least one of a received signal acquisition unit, a received signal measurement unit, and a traffic measurement unit.

8. The radio frequency selection apparatus as claimed in claim 3, further comprising:

a threshold setting unit for setting up a threshold based on the information provided by the mobile station and the traffic information.

9. A multi-band resource management method of a plurality of cellular systems using a plurality of frequency bands wherein the cellular systems include a higher frequency band system and a lower frequency band system, the method comprising the steps of:

- acquiring environmental information about a mobile station for each of one or more of the frequency bands available to the mobile station; and
- determining based on the environmental information and mobile station information provided by the mobile station which of one or more of the frequency bands is to be used and which of the systems is to be connected to the mobile station, wherein
- the environmental information comprising a radio-wave-propagation property of the mobile station, and
- the step of determining comprises determining that the higher frequency band system is to be used if the mobile station resides in a better radio-wave-propagation area and the lower frequency band system is to be used if the mobile station resides in a worse radio-wave-propagation area.

* * * * *